United States Patent
DeRisi et al.

(10) Patent No.: US 12,442,818 B2
(45) Date of Patent: Oct. 14, 2025

(54) AUTOANTIBODIES AS BIOMARKER OF PARANEOPLASTIC ENCEPHALITIS ASSOCIATED WITH TESTICULAR CANCER

(71) Applicants: CZ Biohub SF, LLC, San Francisco, CA (US); The Regents of the University of California, Oakland, CA (US); Mayo Foundation for Medical Education and Research, Rochester, MN (US)

(72) Inventors: Joseph L. DeRisi, San Francisco, CA (US); Michael R. Wilson, Oakland, CA (US); Caleigh Mandel-Brehm, Oakland, CA (US); Brian O'Donovan, Oakland, CA (US); Sean J. Pittock, Rochester, MN (US); Divyanshu Dubey, Rochester, MN (US); Thomas J. Kryzer, Mantorville, MN (US); Vanda A. Lennon, Rochester, MN (US); Andrew McKeon, Rochester, MN (US)

(73) Assignees: CZ Biohub SF, LLC; The Regents of the University of California; Mayo Foundation for Medical Education and Research

(*) Notice: Subject to any disclaimer, the term of this patent is extended or adjusted under 35 U.S.C. 154(b) by 940 days.

(21) Appl. No.: 17/439,359

(22) PCT Filed: Mar. 13, 2020

(86) PCT No.: PCT/US2020/022592
§ 371 (c)(1),
(2) Date: Sep. 14, 2021

(87) PCT Pub. No.: WO2020/190700
PCT Pub. Date: Sep. 24, 2020

(65) Prior Publication Data
US 2022/0196662 A1 Jun. 23, 2022

Related U.S. Application Data

(60) Provisional application No. 62/819,379, filed on Mar. 15, 2019.

(51) Int. Cl.
*G01N 33/574* (2006.01)
*A61K 38/45* (2006.01)
*A61K 39/395* (2006.01)
*A61P 35/00* (2006.01)
*G01N 33/564* (2006.01)

(52) U.S. Cl.
CPC ....... *G01N 33/57407* (2013.01); *A61K 38/45* (2013.01); *A61K 39/395* (2013.01); *A61P 35/00* (2018.01); *G01N 33/564* (2013.01); *G01N 2800/28* (2013.01)

(58) Field of Classification Search
CPC .......... G01N 33/57407; G01N 33/564; G01N 2800/28; A61K 38/45; A61K 39/395; A61P 35/00
See application file for complete search history.

(56) References Cited

U.S. PATENT DOCUMENTS

2009/0252714 A1  10/2009  Sahin et al.
2017/0307607 A1  10/2017  Lim et al.

OTHER PUBLICATIONS

Mandel-Brehm et al. Supplemental Appendix (The New England Journal of Medicine 38(1): 1-16, Jul. 4, 2019).*
Hussain et al. Immunosuppressive Drugs. Encyclopedia of Infection and Immunity. 726-740, Published online Apr. 8, 2022.*
Dalmau et al., Clinical Analysis of Anti-Ma2-Associated Encephalitis, Brain, vol. 127, No. 8, Aug. 2004, pp. 1831-1844.
European Application No. 20773396.5, Extended European Search Report mailed on Nov. 24, 2022, 9 pages.
Voltz et al., A Serologic Marker of Paraneoplastic Limbic and Brain-stem Encephalitis in Patients with Testicular Cancer, The New England Journal of Medicine, vol. 341, No. 19, Jun. 10, 1999, pp. 1475-1476.
PCT/US2020/022592, "International Preliminary Report on Patentability", Sep. 30, 2021, 7 pages.
Conwell, "TRIM27 in HSV-1 Infection: A Story of Loss and Death", Doctoral dissertation, Available online at: https://dash.harvard.edu/bitstream/handle/1/17463971/CONWELL-DISSERTATION-2015.pdf?sequence=7&IsAllowed=y, Mar. 2015, 140 pages.
PCT/US2020/022592, "International Search Report and Written Opinion", Jun. 16, 2020, 9 pages.
Mandel-Brehm et al., "Kelch-like Protein 11 Antibodies in Seminoma-Associated Paraneoplastic Encephalitis", N Engl J Med, Jul. 4, 2019, pp. 47-54, 381;1.

* cited by examiner

*Primary Examiner* — Alana Harris Dent
(74) *Attorney, Agent, or Firm* — Grüneberg and Myers PLLC

(57) ABSTRACT

This disclosure describes methods and compositions for detecting the presence of a Kelch-like protein 11 autoantibody in a biological sample. Also provided are methods of treating subjects with testicular cancer or a premalignant condition and paraneoplastic encephalomyelitis.

26 Claims, 8 Drawing Sheets
Specification includes a Sequence Listing.

SAGITTAL MOUSE BRAIN SECTION

PERIVENTRICULAR PARENCHYMA
DAPI · Human IgG

HIPPOCAMPUS
DAPI · Human IgG

AUTOANTIBODIES AS BIOMARKER OF PARANEOPLASTIC ENCEPHALITIS ASSOCIATED WITH TESTICULAR CANCER

CROSS-REFERENCE TO RELATED APPLICATIONS

This application is a 371 U.S. national phase application of PCT Application No. PCT/US2020/022592, filed Mar. 13, 2020, which claims the benefit of priority of U.S. Provisional Application No. 62/819,379, filed Mar. 15, 2019. This provisional application is incorporated by reference herein in its entirety for all purposes.

SEQUENCE LISTING

The instant application contains a Sequence Listing which has been submitted electronically in ASCII format and is hereby incorporated by reference in its entirety. Said ASCII copy, created on Jan. 31, 2020, is named 103182-1173322-001810WO_SL and is 20,635 bytes in size.

BACKGROUND

Seminoma is a germ cell tumor of the testicle or, more rarely, the mediastinum or other extra-gonadal locations. It is a malignant neoplasm and is one of the most treatable and curable cancers, with a survival rate above 95% if discovered in early stages. Testicular seminoma originates in the germinal epithelium of the seminiferous tubules. About half of germ cell tumors of the testicles are seminomas.

Paraneoplastic neurologic syndromes (PNSs) are a group of conditions that affect the nervous system (brain, spinal cord, nerves and/or muscles) in patients with cancer. In some instances, PNSs can be the first symptom of a covert malignancy. The term "paraneoplastic" means that the neurological syndrome is not caused by the tumor itself, but by the immunological reactions that the tumor produces. It is believed that the body's normal immunological system interprets the tumor as an invasion. When this occurs, the immunological system mounts an immune response, utilizing antibodies and lymphocytes to fight the tumor. The end result is that the patient's own immune system can cause collateral damage to the nervous system, which can sometimes be severe. In many patients, the immune response can cause nervous system damage that far exceeds the damage done to the tumor. Early treatment of PNS may improve the morbidity and mortality rates of cancer patients.

The Ma2 autoantibody (also known as anti-Ta) is the only known biomarker of neurologic autoimmunity associated with a germ cell tumor of the testis (seminoma). Most of these cases have paraneoplastic brainstem and/or limbic encephalitis. The coherence of this clinical syndrome, and its strong association with a specific cancer makes Ma2 autoantibodies an important serological biomarker. However, some men with seminoma-associated paraneoplastic encephalitis are seronegative for anti-Ma2 antibodies. As such, there is a need for additional markers that can identify non-Ma2 autoantibody-associated paraneoplastic encephalitis associated with testicular cancer.

BRIEF SUMMARY

In one aspect, provided is a method of detecting the presence of a Kelch-like protein 11 (KLHL11) autoantibody in a biological sample from a male subject presenting with encephalitis. The method includes the steps of: (a) contacting the biological sample with a KLHL11 polypeptide or antigenic fragment or variant thereof; and (b) detecting the presence of binding of the KLHL11 polypeptide or antigenic fragment or variant thereof to the KLHL11 autoantibody in the biological sample.

In some instances, the KLHL11 polypeptide or antigenic fragment or variant thereof is in brain tissue or other nervous tissue. In some instances, the KLHL11 polypeptide or antigenic fragment or variant thereof is heterologously-expressed on the surface of a cell, a phage, or a virus. In some instances, the KLHL11 polypeptide or antigenic fragment or variant thereof is in a phage display or eukaryotic cell display library. In some instances, the KLHL11 polypeptide or antigenic fragment or variant thereof is an isolated, purified KLHL11 polypeptide or fragment thereof. In some instances, the KLHL11 polypeptide or antigenic fragment or variant thereof is an isolated, purified KLHL11 polypeptide or antigenic fragment or variant thereof that is immobilized on a solid carrier. In some instances, the KLHL11 polypeptide or antigenic fragment or variant thereof comprises one or more of the sequences of SEQ ID NOs: 1-30. In some instances, the KLHL11 polypeptide or antigenic fragment or variant thereof comprises the sequence of SEQ ID NO:4.

In some instances, the male subject has one or more of ataxia, cognitive decline, mood disorder, hearing loss, tinnitus, trigeminal neuralgia, vertigo, diplopia, dysarthria, or other neurological deficit. In some instances, the male subject has one or more of ataxia, hearing loss, tinnitus, or vertigo. In some instances, the male subject has at least one of: (i) a cerebrospinal fluid protein count of greater than 30 mg per deciliter; (ii) a cerebrospinal fluid blood cell count of at least 1 per cubic millimeter; (iii) two or more cerebrospinal oligoclonal bands; or (iv) a CSF index greater than 0.6. In some instances, the male subject has at least one risk factor for testicular cancer. In some instances, the male subject has not been previously diagnosed with testicular cancer. In some instances, the male subject has been previously treated for testicular cancer or a premalignant condition or is being treated for testicular cancer or a premalignant condition. In some instances, the biological sample is serum, plasma, cerebrospinal fluid, blood, or urine.

In some instances, the presence of the binding of the KLHL11 polypeptide or antigenic fragment or variant thereof to said KLHL11 autoantibody in the biological sample indicates that the subject has or is at risk of having testicular cancer or a premalignant testicular condition. In some instances, the presence of the binding of the KLHL11 polypeptide or antigenic fragment or variant thereof to said KLHL11 autoantibody in the biological sample indicates that the subject has paraneoplastic encephalitis. In some instances, the testicular cancer is seminoma. In some instances, the premalignant testicular condition is at least one of testicular microlithiasis, testicular atrophy, or testicular fibrosis.

In some instances, step (b) of detecting is performed by at least one of immunohistochemical staining, immunoprecipitation, microarray analysis, enzyme-linked immunosorbent assay (ELISA), or Western blot analysis.

In some instances, the KLHL11 polypeptide or fragment thereof is in a tissue section, wherein step (a) comprises contacting the tissue section with the biological sample and a detectably-labeled secondary antibody under conditions in which a complex is formed between KLHL11 polypeptides in the tissue section, a corresponding KLHL11 autoantibody in the biological sample, if present, and the detectably-labeled secondary antibody, and wherein step (b) comprises identifying a pattern of complex formation in the tissue sample by detecting the detectably-labeled secondary antibody, wherein the presence of a pattern of complex formation is indicative of the presence of a KLHL11 autoantibody in the biological sample, and wherein the absence of a pattern of complex formation is indicative of the absence of a KLHL11 autoantibody in the biological sample. In some instances, the pattern of complex formulation in the brain tissue is sparse yet widespread throughout the brain, including the hippocampus, cerebral cortex, cerebellum, midbrain, and brain stem, and is enriched in perivascular tissue, perimeningeal tissue, and white matter tracts.

In some instances, the KLHL11 polypeptide or fragment thereof is heterologously-expressed on the surface of a cell, wherein step (a) comprises contacting the cell heterologously-expresses the KLHL11 polypeptide or antigenic fragment or variant thereof on its surface with the biological sample and a detectably-labeled secondary antibody under conditions in which a complex is formed between KLHL11 polypeptides in the tissue section, a corresponding KLHL11 autoantibody in the biological sample, if present, and the detectably-labeled secondary antibody, and wherein step (b) comprises detecting the detectably-labeled secondary antibody, wherein detecting the presence of the detectably-labeled secondary antibody is indicative of the presence of a KLHL11 autoantibody in the biological sample, and wherein not detecting the presence of the detectably-labeled secondary antibody is indicative of the absence of a KLHL11 autoantibody in the biological sample.

In another aspect, provided is a method of treating a male subject having testicular cancer or a premalignant testicular condition and paraneoplastic encephalomyelitis. The method includes the steps of: (a) detecting the presence or absence of a Kelch-like protein 11 (KLHL11) autoantibody in a biological sample from a male subject presenting with rhomboencephalitis, such as by using any of the methods described above, wherein detecting the KLHL11 autoantibody in the biological sample indicates that the subject has testicular cancer or a premalignant condition and paraneoplastic encephalomyelitis; (b) performing an examination of the male subject to determine the presence of testicular cancer or a premalignant testicular condition in the male subject; and (c) administering to the male subject an immunosuppressive therapy and, if the male subject has testicular cancer or a premalignant testicular condition, a treatment for testicular cancer or the premalignant testicular condition.

In some instances, the male subject has one or more of ataxia, cognitive decline, mood disorder, hearing loss, tinnitus, trigeminal neuralgia, vertigo, diplopia, dysarthria, or other neurologic deficit. In some instances, the male subject has one or more of ataxia, hearing loss, tinnitus, or vertigo. In some instances, the male subject has at least one of: (i) a cerebrospinal fluid protein count of at least 30 mg per deciliter; (ii) a cerebrospinal fluid cell blood count of at least 1 per cubic millimeter; (iii) two or more cerebrospinal oligoclonal bands; or (iv) an IG index greater than 0.6. In some instances, the male subject was previously treated for testicular cancer or a premalignant condition or is being treated for testicular cancer or a premalignant condition. In some instances, the male subject has not been previously diagnosed with testicular cancer. In some instances, the male subject is being treated with chemotherapy. In some instances, the testicular cancer is seminoma. In some instances, the premalignant testicular condition is one or more of testicular microlithiasis, testicular atrophy, or testicular fibrosis.

In some instances, the immunosuppressive therapy comprises at least one of an immunosuppressant drug, intravenous immunoglobulin administration, plasma exchange plasmapheresis, immunoadsorption, or oral administration of a KLHL11 polypeptide or antigenic fragment or variant thereof. In some instances, the treatment for testicular cancer or the premalignant testicular condition comprises at least one of orchiectomy, radiation, chemotherapy, or immunotherapy.

BRIEF DESCRIPTION OF THE DRAWINGS

The present application includes the following figures. The figures are intended to illustrate certain embodiments and/or features of the compositions and methods, and to supplement any description(s) of the compositions and methods. The figures do not limit the scope of the compositions and methods, unless the written description expressly indicates that such is the case.

DETAILED DESCRIPTION

Figure 1A:
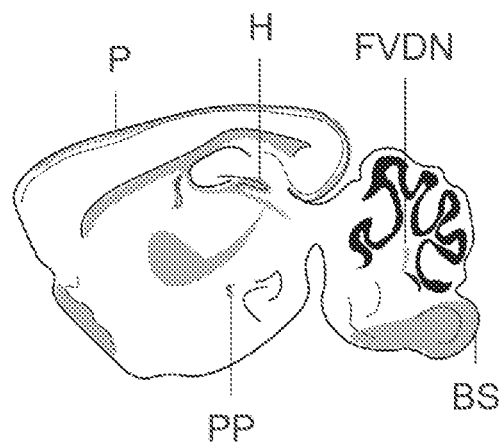
FIG. 1A and FIG. 1B show representative images of "Sparkles" immunofluorescence (IF) staining patterns on mouse brain tissue according to certain aspects of this disclosure. A schematic of a sagittal mouse brain section, with graphic summary of IF signal is shown for illustrative purposes in FIG. 1A. Patient IgG reactivity is enriched, though not limited to, the shaded regions of the brain. Shaded areas designated with a letter have a corresponding representative image; periventricular parenchyma (PP), hippocampus in the vicinity of the dentate gyrus (H), perimeningeal (P), vicinity of fourth Ventricle to Dentate Nucleus, (FVDN), and brainstem (BS). Similar staining also observed, for example, in the cerebral cortex, cerebellum and midbrain regions (data not shown). Patient IgG reactivity to mouse brain sections was visualized using anti-Human IgG Secondary (Alexa 568); DAPI was used to mark nuclei. Magnification 20×. Scale bar denotes 50 microns. The staining pattern is small punctate dots sparsely distributed throughout the depicted tissue regions.
Figure 1A:
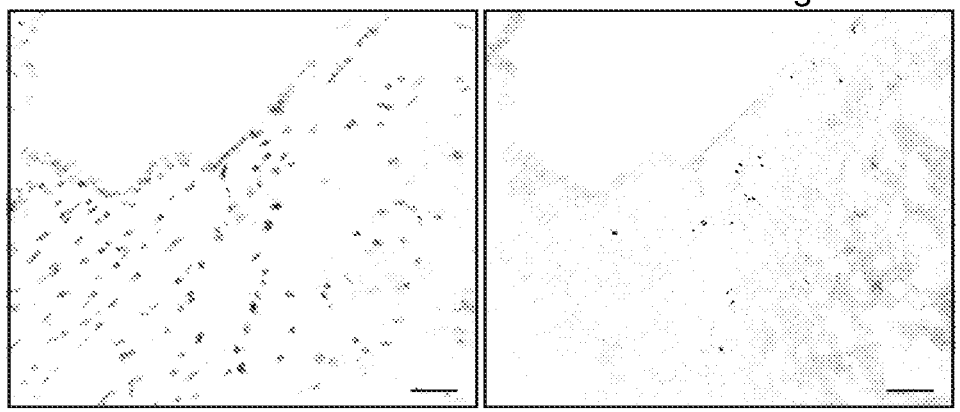
Figure 1A:
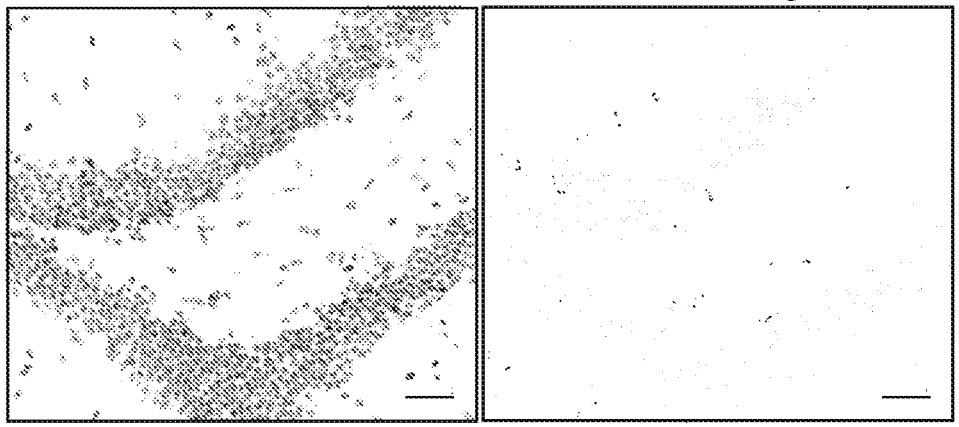

As used in the disclosure and the appended claims, the singular forms "a," "an," and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

Unless defined otherwise, all technical and scientific terms used herein have the same meaning as commonly understood by one of ordinary skill in the art to which this invention belongs. All publications mentioned herein are incorporated herein by reference for the purpose of describing and disclosing devices, compositions, formulations and methodologies which are described in the publication and which might be used in connection with the presently described invention.

A specific Immunoglobulin G (IgG) autoantibody marker has been identified in male subjects having testicular cancer presenting with encephalitis. The target of this novel autoantibody marker has been identified as Kelch-like protein 11 (KLHL11). In the brain, its distribution pattern is sparse yet widespread, including the hippocampus, cerebral cortex, cerebellum, midbrain, and brain stem, and it is enriched in perivascular tissue, perimeningeal tissue, and white matter tracts. This disclosure describes methods and compositions for immunohistochemically detecting the presence of KLHL11 autoantibodies in a biological sample. For example, this disclosure provides for methods of detecting KLHL11 autoantibodies in a male subject that presents with rhomboencephalitis. In some embodiments, provided are methods of determining if a male subject that presents with rhomboencephalitis is serologically positive for a KLHL11 autoantibody. Also provided are methods of treating a male subject that has testicular cancer or a malignant testicular condition and presents with rhomboencephalitis, wherein the male subject is serologically positive for one or more KLHL11 autoantibodies.

The KLHL gene family encodes a group of proteins which play an important role in ubiquitination. Forty-two KLHL genes have been identified, and KLHL11 is the phylogenetically oldest member of the family. These proteins have been conserved throughout evolution. The KLHL (Kelch-like) gene family encodes proteins that constitute a subgroup at the intersection between the BTB/POZ domain and Kelch domain superfamilies. Members generally possess a BTB/POZ domain, a BACK domain, and five to six Kelch motifs. BTB domains facilitate protein binding and dimerization. The BACK domain has no known function yet is of functional importance since mutations in this domain are associated with disease. Kelch domains form a tertiary structure of β-propellers that have a role in extracellular functions, morphology, and binding to other proteins.

The human Kelch-like protein 11 (KLHL11) is 708 amino acid. See UniProt Database Entry UniProt/UniProtKB Database Entry Q9NVR0.1. KLHL11 is a component of a cullin-RING-based BCR (BTB-CUL3-RBX1) E3 ubiquitin-protein ligase complex that mediates the ubiquitination of target proteins, leading most often to their proteasomal degradation. Cullin-based E3 ligases target substrates for ubiquitin-dependent degradation by the 26S proteasome.

Mutations in several KLHL family genes have been associated with various neurological disorders including spinocerebellar ataxia 8 (KLHL1), distal myopathy (KLHL9) and giant axonal neuropathy (KLHL16). Furthermore, autoantibodies against KLHL7 and KLHL12 have been reported in autoimmune disorders, such as Sjögren syndrome, as well as cancer. Through the phage display system described in this disclosure, a KLHL11 epitope was identified that is recognized by the cerebrospinal fluid of male subjects presenting with rhomboencephalitis clinical syndrome who were found to have testicular cancer. This epitope does not share homology to the previously identified KLHL antigens, and the most closely related KLHL family member, KLHL18, shares only approximately 30% amino acid similarity in this region. To the inventors' knowledge, there have been no previously published reports that have implicated KLHL11 in autoimmunity.

As provided herein, autoantibodies that bind specifically to KLHL11 are valuable serological markers of a subject's immune response to cancer or premalignant conditions. Such markers are not found in healthy subjects and are accompanied by subacute neurological symptoms and signs. KLHL11 autoantibodies represent only the second biomarker for paraneoplastic encephalitis in male subjects with testicular cancer, and identifies patients that are not seropositive for anti-Ma2 autoantibodies (i.e. a distinct patient population). See Mandel-Brehm, C., et al., 2019. New England Journal of Medicine 381:47-54, which is incorporated by reference herein in its entirety. Thus, this biomarker solves the problem of providing a biomarker capable of identifying patients that have testicular cancer or a premalignant testicular condition and paraneoplastic encephalitis that would not otherwise be identified using known autoantibody biomarkers. Such patients are often misdiagnosed for extended periods of time and do not receive appropriate treatment for their condition, as exemplified by the patient described in Example 2. The biomarker also appears to have relatively high prevalence. The methods provided herein are useful for the serological evaluation of male subjects who present with a subacute neurological disorder of undetermined etiology, particularly rhomboencephalitis, to assist in clinical diagnosis, pre-operative identification of testicular cancer (e.g., seminoma) or testicular premalignant condition (e.g., testicular microlithiasis, testicular atrophy, testicular fibrosis), and ultimately appropriate therapeutic intervention. In some instances, the provided methods are useful for directing a focused search for testicular cancer. In some instances, the provided methods are useful for investigating neurological symptoms that appear in the course of, or after, cancer therapy, and are not explainable by metastasis. In some instances, the provided methods are useful for differentiating autoimmune neuropathies from neurotoxic effects of chemotherapy. In some instances, the provided methods are also useful for monitoring the immune response of seropositive patients in the course of cancer therapy. In some instances, the provided methods are useful for detecting early evidence of cancer recurrence in previously seropositive patients. In some instances, the methods may identify a male subject that does not have testicular cancer or a premalignant testicular condition but who is as at risk of developing testicular cancer or a premalignant testicular condition. Such patients can then be monitored for development of such conditions so that treatment can be administered promptly.

A. Methods of Detection and Compositions

In one aspect, a KLHL11 polypeptide or antigenic fragment or variant thereof can be used in various immunological techniques to detect KLHL11-specific antibodies. The entire KLHL11 protein can used in the provided methods, a fragment of the KLHL11 protein may be used, a variant of the KLHL11 protein may be used, or a combination of two or more of the full length polypeptide, a fragment, or a variant thereof as described in this disclosure may be used. For example, KLHL11 polypeptides can be used in an immunoassay to detect KLHL11 autoantibodies in a biological sample. KLHL11 polypeptides used in an immunoassay can be in a cell lysate (such as, for example, a whole cell lysate or a cell fraction), or purified KLHL11 polypeptides or fragments thereof can be used provided at least one antigenic site recognized by KLHL11-specific antibodies (such as KLHL11 autoantibodies) remains available for binding.

In one aspect, provided are methods of detecting the presence of a KLHL11 autoantibody in a biological sample from a male subject presenting with rhomboencephalitis, comprising the steps of contacting the biological sample with a KLHL11 polypeptide or antigenic fragment or variant thereof and detecting the presence of binding of the KLHL11 polypeptide or fragment thereof to KLHL11 autoantibodies in the biological sample.

A "biological sample," as used herein, is generally a sample from a male subject, preferably a male mammalian subject. Exemplary subjects include, but are not limited to humans, non-human primates such as monkeys, dogs, cats, mice, rats, cows, horses, camels, goats, and sheep. In some embodiments, the subject is a male human. In the context of this disclosure, a male subject is considered a subject with male gonad tissue or male gonad tissue cells present in their person. In some instances, a male subject for the purposes of this disclosure may be an intersex subject, such subjects born with a mixture of male and female sex characteristics and having male gonad tissue or male gonad tissue cells present in their person. In some instances, a male subject for the purposes of this disclosure may be a genetically male subject who has undergone gender reassignment surgery to have female physical characteristics, such subjects having male gonad tissue or male gonad tissue cells present in their person. Non-limiting examples of biological samples include blood, serum, plasma, cerebrospinal fluid (CSF), urine. Additionally, solid tissues, for example, brain biopsies or tissue biopsies containing other nervous tissue may be used.

Figure 2:
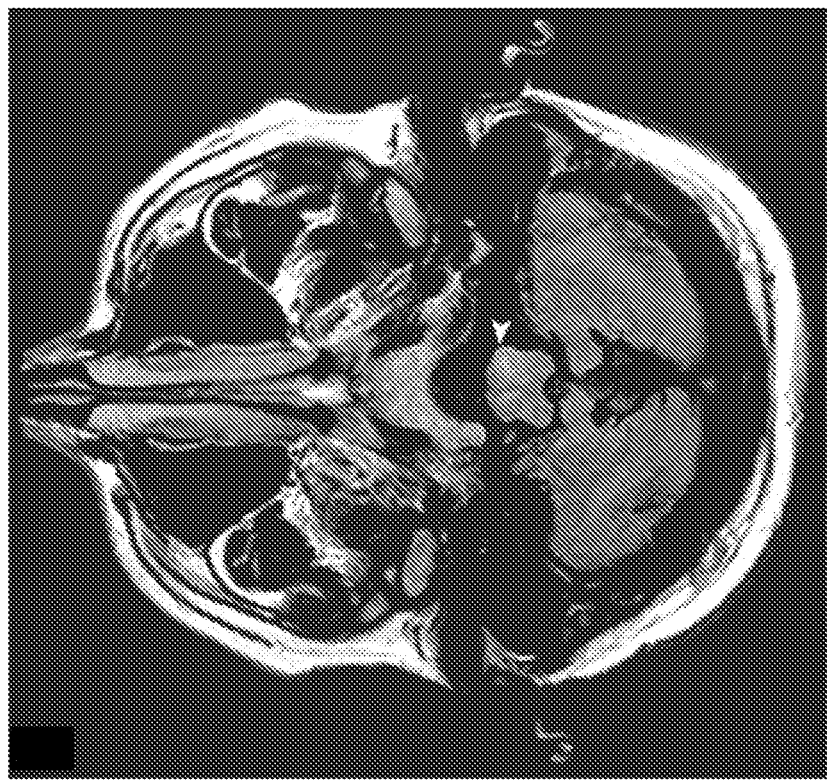
FIG. 2 shows neuroradiological images of a male subject (patient 11) presenting with rhomboencephalitis clinical syndrome symptoms (as described in Example 2) in which Kelch-like protein 11 (KLHL11)-specific autoantibodies were identified according to certain aspects of this disclosure. Shown are axial T2-weighted fluid-attenuated inversion recovery (FLAIR) images. The image on the left was acquired during the subject's initial presentation and shows a non-enhancing hyperintensity (arrow) around the fourth ventricle, including the right dentate nucleus. The image on the right was acquired from the subject 10 months later after further neurologic decline and shows interval development of left hypertrophic olivary degeneration (arrow).
Figure 2:
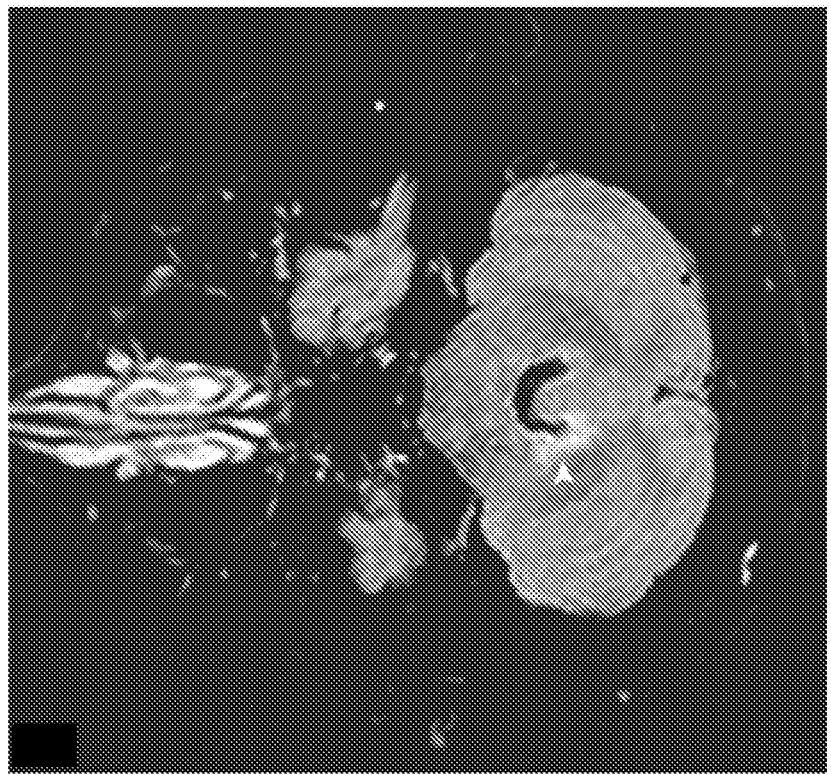

In some embodiments, the male subject has or is suspected to have paraneoplastic encephalitis. In some embodiments, the male subject is diagnosed with paraneoplastic encephalitis. In some embodiments, the male subject presents with rhomboencephalitis. In some embodiments, the male subject has one or more of ataxia, cognitive decline, mood disorder, hearing loss (such as sensorineural hearing loss), tinnitus, trigeminal neuralgia, vertigo, diplopia, dysarthria, or other neurological deficits. In some embodiments, the male subject has one or more of ataxia, hearing loss, tinnitus, or vertigo. In one example, as shown in FIG. 2 and described in Example 2, a male subject that is seropositive for KLHL11-specific autoantibodies can present with rhomboencephalitis clinical syndrome symptoms, such as a non-enhancing hyperintensity around the fourth ventricle, including the right dentate nucleus, and, as the disease advances in the absence of appropriate treatment, evidence further neurologic decline, including interval development of left hypertrophic olivary degeneration.

In some embodiments, the male subject has at least one of a cerebrospinal fluid (CSF) protein count greater than 30 mg per deciliter, a cerebrospinal fluid cell count of at least 1 per cubic millimeter, two or more cerebrospinal oligoclonal bands, or an elevated CSF index (greater than 0.6).

In some instances, the male subject has an elevated CSF protein count. An abnormal protein level in the CSF suggests a problem in the central nervous system. Increased protein level may be a sign of a tumor, bleeding, nerve inflammation, or injury. A normal range generally 15-45 mg per deciliter. In some embodiments, the male subject has a CSF protein count greater than 30 mg per deciliter. In some embodiments, the male subject has a CSF protein count greater than 40 mg per deciliter. In some instances, the male subject's CSF protein count may be at least 70 mg per deciliter. For example, the male subject's CSF protein count can be 30 mg, 40 mg, 45 mg, 50 mg, 55 mg, 60 mg, 65 mg, 70 mg, 75 mg, 80 mg, 90 mg, 95 mg, or 100 mg per deciliter. For example, the male subject's CSF protein count can be 30-100 mg per deciliter. In another example, the male subject's CSF protein count can be 40-100 mg per deciliter.

In some instances, the male subject has blood cells present in his CSF. This can be determined by a CSF cell count test, which measures the number of red and white blood cells that are in the subject's CSF. The normal white blood cell (leukocyte) count is between 0 and 5. An increase of white blood cells indicates infection, inflammation, or bleeding into the cerebrospinal fluid. The normal red blood cell count is zero. Finding red blood cells in the CSF may be a sign of bleeding. However, red blood cells in the CSF may also be due to a spinal tap needle hitting a blood vessel when obtaining the CSF sample from the subject. In some embodiments, the male subject has leukocytes present in his CSF. In some embodiments, the male subject has a CSF cell count of at least 1 per cubic millimeter. In some embodiments, the male subject has a CSF cell count of at least 1 red blood cell per cubic millimeter. In some embodiments, the male subject has a CSF cell count of at least 1 leukocyte per cubic millimeter. In some embodiments, the male subject has a CSF cell count of 1-100 leukocyte per cubic millimeter. In some instances, the subject's CSF can contain 1, 2, 3, 4, 5, 6, 7, 8, 9, 10, 15, 20, 25, 30, 35, 40, 45, 50, 55, 60, 65, 70, 75, 85, 90, 95, or 100 blood cells per cubic millimeter. In some instances, the blood cells in the subject's CSF are predominantly leukocytes. In some instances, the subject's CSF can contain 1, 3, 6, 9, 10, 15, 20, 25, 30, 35, 40, 45, 50, 55, 60, 65, 70, 75, 80, 85, 90, 95, or 100 leukocytes per cubic millimeter.

Elevation of IgG levels in the cerebrospinal fluid (CSF) of patients with inflammatory diseases of the central nervous system is due to local central nervous system (CNS) synthesis of IgG. Commonly used diagnostic laboratory tests for CSF IgGs are CSF index and oligoclonal banding.

In some embodiments, the male subject has an elevated CSF index. The CSF index is the CSF IgG to CSF albumin ratio compared to the serum IgG to serum albumin ratio. The CSF index is, therefore, an indicator of the relative amount of CSF IgG compared to serum. Any increase in the index is a reflection of IgG production in the CNS. The IgG synthesis rate is a mathematical manipulation of the CSF index data and can also be used as a marker for CNS inflammatory diseases. A normal CSF index is <0.6. In some embodiments, the male subject has a CSF index of 0.8, 1.0, 1.2, 1.4, 1.6, 1.8, 2.0, 2.2, 2.4, 2.6, 2.8, or 3.0. In some instances, the male subject has a CSF index of 1.0-2.0.

In some embodiments, the male subject has two or more cerebrospinal oligoclonal bands, which representing immunoglobulin proteins in the CSF. The CSF oligoclonal band screen (or CSF immunofixation) looks for these bands in CSF samples. The screen is often performed by protein separation by isoelectric focusing followed by immunoblotting. A normal result is no bands or just one band. Two or more oligoclonal IgG bands detected by separation of CSF proteins that are not also present in the subject's blood or serum reflect a local B-cell response accompanying CNS inflammation. In some embodiments, the male subject has 2, 3, 4, 5, 6, 7, 8, 9, 10, 11, 12, 13, 14, or 15 oligoclonal bands in his CSF.

In some instances, the male subject has at least one risk factor for testicular cancer. The risk factors for testicular cancer include one or more of having an undescended testicle, having testicular microlithiasis, having testicular atrophy, having testicular fibrosis, having a past history of testicular cancer, having a family history of testicular cancer, and having a human immunodeficiency virus (HIV) infection. In some instances, a testicular cancer risk factor includes carcinoma in situ of the testicle, which may advance to invasive cancer. About half of testicular cancers occur in men between the ages of 20 and 34. But this cancer can affect males of any age, including infants and elderly men. The risk of testicular cancer among Caucasian men is about 4 to 5 times that of black and Asian-American men. The risk for American Indians falls between that of Asian-American men and Caucasian men. Worldwide, the risk of developing this disease is highest among men living in the United States and Europe and lowest among men living in Africa or Asia. Early diagnosis and treatment of the neoplasm favor less neurological morbidity and offer the best hope for survival.

In some instances, the male subject was previously treated for testicular cancer or a pre-malignant condition. In some instances, the male subject is being treated for testicular cancer, or a pre-malignant condition. For example, the male subject can previously have been treated for or is undergoing treatment for seminoma or a non-seminoma. In another example, the male subject can previously have been treated for or is undergoing treatment for one or more of pretesticular microlithiasis, testicular atrophy, or testicular fibrosis.

Figure 8:
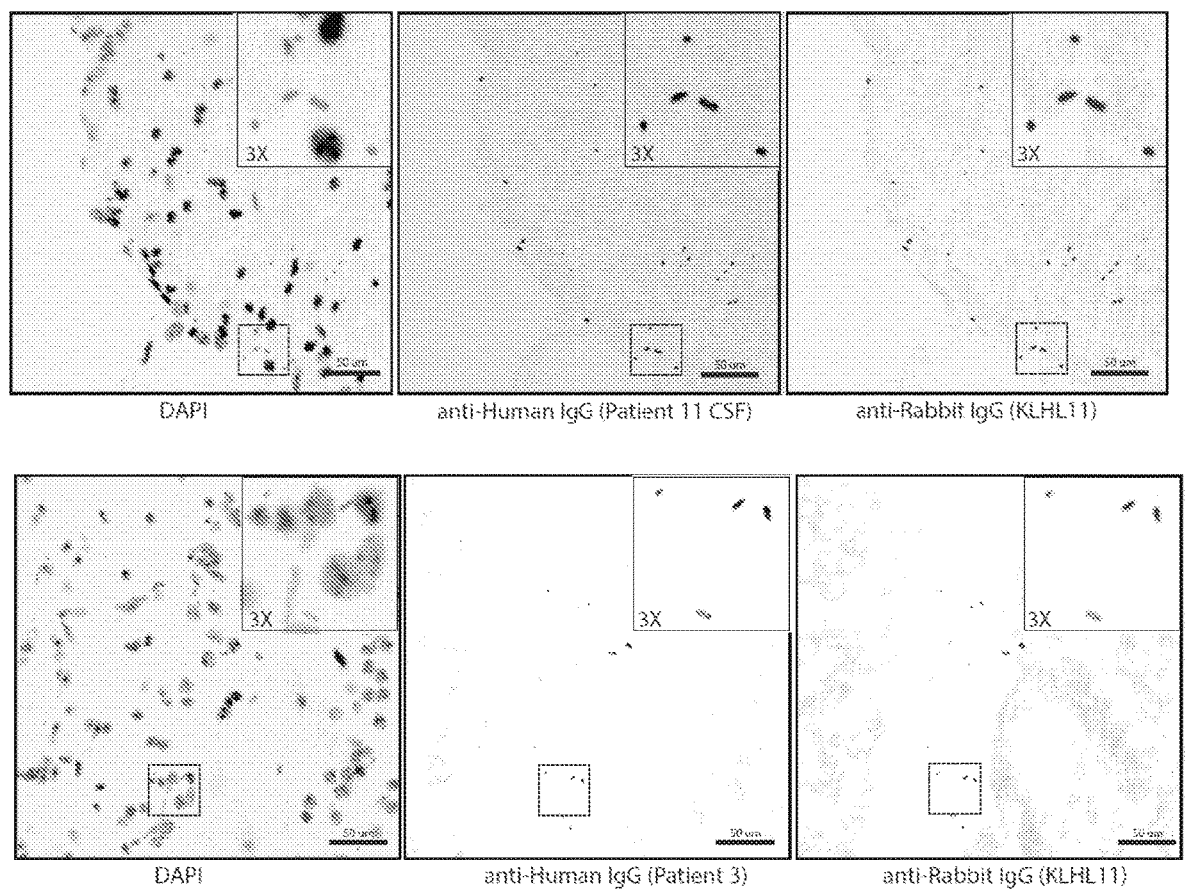
FIG. 8 shows co-localization of IF signal from KLHL11 patient 11 (left) and patient 3 right) with commercial antibody to KLHL11 on mouse brain tissue. Staining is bright, sparse punctate dots in image, with the staining of both antibodies fully overlaid with each other. Magnification 20×. Scale bar denotes 50 microns. Panel inset is 3× magnification of original image.

Generally, the biological sample is assessed for the presence of KLHL11 autoantibodies by contacting it with a KLHL11 polypeptide or antigenic fragment or variant thereof. In some embodiments, the KLHL11 polypeptide or fragment thereof is present in a solid tissue such as a tissue section. For example, a tissue sample comprising KLHL11 polypeptides or fragments may be used, which may be in the form of a tissue section fixed on a carrier, for example a glass slide for microscopic analysis. For example, the solid tissue can be brain tissue or tissue biopsies containing other nervous tissue. For example, the KLHL11 polypeptide or fragment thereof can be in brain tissue. In another example, a tissue section of brain tissue can be used. The tissue sample is preferably of neuronal origin or contains nervous tissue and may be a sample of brain tissue, such as a brain section selected from the group comprising hippocampus, cerebral cortex, cerebellum, midbrain, and brain stem, perivascular tissue, perimeningeal tissue, and white matter tracts. In some embodiments, the KLHL11 polypeptide or fragment thereof is present in a sample from a mammal. For example, mouse tissue is routinely used in immunohistochemistry, as shown in FIG. 8, but tissue from other rodents (e.g., rats) or other mammals (e.g., rabbits, non-human primates, or humans) also can be used in the present methods. Tissue sections used in immunohistochemistry are well known in the art and are commercially available from a number of companies (e.g., Asterand, Inc. (Detroit, Michigan); Euroimmun (Morris Plains, New Jersey); and Imgenex (San Diego, California)). In other embodiments, the KLHL11 polypeptide or fragment thereof is in a cell lysate, blood, serum, cerebrospinal fluid (CSF), or urine.

In other embodiments, a liquid sample comprising KLHL11 autoantibodies from a subject may be used to practice the methods. Exemplary liquid samples include cell lysate, blood, serum, cerebrospinal fluid (CSF), and urine. A step of contacting a liquid sample comprising KLHL11 autoantibodies with a KLHL11 polypeptide or antigenic fragment or variant thereof may be carried out by incubating an immobilized form of said polypeptide in the presence of the liquid sample under conditions that are compatible with the formation of a complex comprising said polypeptides and said KLHL11 autoantibodies. Optionally, the liquid sample, then at least partially depleted of KLHL11 autoantibodies may subsequently be removed to facilitate detection of a complex between the KLHL11 autoantibodies and the KLHL11 polypeptide or fragment thereof. Optionally, one or more washing steps may be contemplated.

In some embodiments, the KLHL11 polypeptide or fragment thereof is an isolated, purified KLHL11 polypeptide or fragment thereof as discussed below. In some embodiments, the KLHL11 polypeptide or fragment thereof is in a phage display or eukaryotic cell display library. In some embodiments, the KLHL11 polypeptide or fragments thereof is heterologously-expressed on the surface of a cell.

In some embodiments, the biological sample is contacted with a KLHL11 polypeptide or fragment thereof and a secondary antibody. As is well known in the art, the secondary antibody is an antibody raised against the IgG of the animal species in which the primary antibody originated. Secondary antibodies bind to the primary antibody to assist in detection, sorting and purification of target antigens to which a specific primary antibody is first bound. The secondary antibody must have specificity both for the antibody species as well as the isotype of the primary antibody being used. If a KLHL11 autoantibody is present in the biological sample, under appropriate conditions, a complex is formed between the KLHL11 polypeptide or fragment thereof, the KLHL11 autoantibody in the biological sample, and the secondary antibody.

A complex comprising the KLHL11 autoantibodies and KLHL11 polypeptides or fragments may be detected using a variety of methods known to the person skilled in the art, for example immunofluorescence microscopy or spectroscopy, luminescence, NMR spectroscopy, immunodiffusion, radioactivity, chemical crosslinking, surface plasmon resonance, native gel electrophoresis, or enzymatic activity. Depending on the nature of the sample, either or both immunoassays and immunocytochemical staining techniques may be used. Enzyme-linked immunosorbent assays (ELISA), Western blot, and radioimmunoassays are methods used in the art, and can be used as described herein to detect the presence of KLHL11 autoantibodies in a biological sample. While some of these methods allow for the direct detection of the complex, in some embodiments, the second antibody is labeled such that the complex may be detected specifically owing to intrinsic properties of the label such as, for example, fluorescence, radioactivity, enzymatic activity, visibility in NMR, or MRI spectra or the like. In some embodiments, the detection method may include any of Western blot, dot blot, protein microarray, ELISA, line blot radioimmune assay, immunoprecipitation, indirect immunofluorescence microscopy, radioimmunoassay, radioimmunodiffusion, ouchterlony immunodiffusion, rocket immunoelectrophoresis, immunohistostaining, complement fixation assay, FACS, and protein chip, but is not limited thereto. Methods and compositions are described herein that can be used for detecting, by immunohistochemistry, the presence of KLHL11 autoantibodies in a biological sample. Immunohistochemical methods are well known in the art, and non-limiting exemplary methods are described in U.S. Pat. Nos. 5,073,504; 5,225,325; and 6,855,552. See also Dabbs, *Diagnostic Immunohistochemistry*, 2$^{nd}$ Ed., 2006, Churchill Livingstone; and Chu & Weiss, *Modern Immunohistochemistry*, 2009, Cambridge University Press. It would be understood by those skilled in the art that immunohistochemistry routinely includes steps that are not necessarily discussed herein in detail such as washing the tissue samples to remove unbound secondary antibodies and the parallel staining experiments with proper controls. Exemplary detection methods are described in the Examples of this disclosure, including radiolabeled ligand binding assays, immunofluorescence, and cell-based expression assays. While particular protocols are described below, variations of these assays are routine and known in the art.

In some instances, the secondary antibody is conjugated to a detectable label. Detectable labels are well known in the art and include, without limitation, a fluorescent label, an enzymatic label, a radioactive label, a luminescent label, or an affinity tag such as biotin or streptavidin. Exemplary fluorescent dyes include water-soluble rhodamine dyes, fluoresceins, 2',7'-dichlorofluoresceins, fluorescein isothiocyanate (FITC), DyLight™ 488, phycoerythrin (PE), propidium iodide (PI), PerCP, PE-Alexa Fluor® 700, Cy5, allophycocyanin, Cy7, benzoxanthene dyes, and energy transfer dyes, as disclosed in the following references: *Handbook of Molecular Probes and Research Reagents*, 8$^{th}$ ed. (2002), Molecular Probes, Eugene, OR; U.S. Pat. Nos. 6,191,278, 6,372,907, 6,096,723, 5,945,526, 4,997,928, and 4,318,846; and Lee et al., 1997, *Nucleic Acids Research* 25:2816-2822. Exemplary enzymatic labels include but are not limited to alkaline phosphatase (AP) and horseradish peroxidase (HP)). Luminescent labels include, e.g., any of a variety of luminescent lanthanide (e.g., europium or terbium) chelates. For example, suitable europium chelates include the europium chelate of diethylene triamine pentaacetic acid (DTPA) or tetraazacyclododecane-1,4,7,10-tetraacetic acid (DOTA). Suitable radioactive labels include, for example, $^{32}$P, $^{33}$P, $^{14}$C, $^{125}$I, $^{131}$I, $^{35}$S, and $^{3}$H. In some instances, the detectable label can be a heterologous polypeptide such as an antigenic tag such as, for example, FLAG, polyhistidine, hemagglutinin (HA), glutathione-S-transferase (GST), or maltose-binding protein (MBP)) for use in purifying the KLHL11 polypeptide or antigenic fragments or variants thereof. In some instances, the detectable label can be a heterologous polypeptide that is useful as diagnostic or detectable marker such as, for example, luciferase, a fluorescent protein (such as a green fluorescent protein (GFP)), or chloramphenicol acetyl transferase (CAT). Another labeling technique which may result in greater sensitivity is the coupling the antibodies to low molecular weight haptens. These haptens can then be specifically altered by means of a second reaction. For example, it is common to use haptens such as biotin, which reacts with avidin, or dinitrophenol, pyridoxal, or fluorescein, which can react with specific anti-hapten antibodies.

Figure 4:
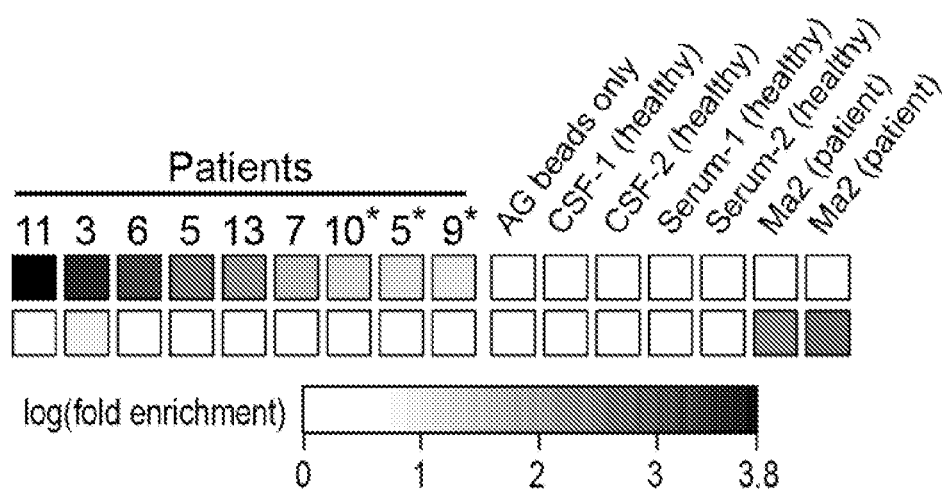
FIG. 4 shows a summary of immunoprecipitation (IP) analysis from a human phage display (10^10 pfu/mL) with patient cerebrospinal fluid (CSF) or serum (serum denoted by asterisk) according to certain aspects of this disclosure. Samples from patients 11, 3, 6, 5, 13, 7, 10, 5, and 9 of the studied cohort are shown. Controls include AG beads alone (negative control), healthy subject CSF and serum samples (two each), and anti-Ma2 encephalitis patients (two CSF samples). The top row shows detection of KLHL11; the bottom row shows detection of Ma2 protein antigen, PNMA2. KLHL11 was enriched in both CSF and serum samples of the studied patient cohort, with substantially more enrichment in CSF samples for patients 11, 3, 6, 5, and 13 relative to serum samples. PNMA2 was enriched in anti-Ma2 encephalitis patient samples, with slight enrichment also detected in the CSF of patient 3 of the studied cohort.
Figure 5:
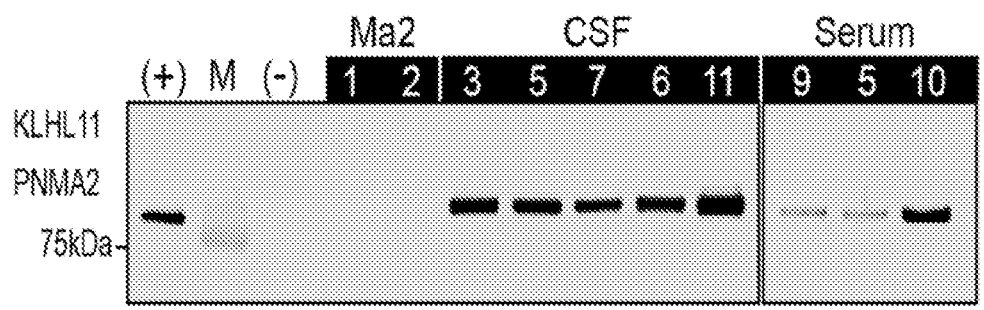
FIG. 5 shows detection of immunoprecipitated KLHL11 by Western blot using anti-Flag antibody according to certain aspects of this disclosure. KLHL11-myc-flag is successfully immunoprecipitated by serum or CSF IgG of patients with autoimmune KLHL11 encephalitis (patients 3, 5, 6, 7, 8, 9 and 10) and by commercial antibody to KLHL11 (+) but not by IgG of patients with anti-Ma2 encephalitis or protein A/G negative control (−). M denotes the protein marker.

In some embodiments, the method comprises contacting a KLHL11 polypeptide or antigenic fragment or variant thereof with a biological sample from a male subject and a secondary antibody having a suitable label thereon under conditions in which a complex is formed between the KLHL11 polypeptide or antigenic fragment or variant thereof, a corresponding KLHL11 autoantibody in the biological sample, if present, and the secondary antibody; and detecting the complex formed, if formed, by detecting the label of the secondary antibody, wherein the presence of the secondary antibody is indicative of the presence of a KLHL11 autoantibody in the biological sample, and wherein the absence of the secondary antibody is indicative of the absence of a KLHL11 autoantibody in the biological sample. In some instances, the secondary antibody is detectably-labeled. Immobilization of the KLHL11 polypeptide or antigenic fragment or variant thereof on a solid carrier can facilitate the method of KLHL11 autoantibody detection as discussed below. In some instances, the method comprises contacting a KLHL11 polypeptide or antigenic fragment or variant thereof having a suitable label thereon with a biological sample from a male subject, and immunoprecipitating any complex formed between the KLHL11 polypeptide or antigenic fragment or variant thereof and a corresponding KLHL11 autoantibody in the biological sample, and monitoring for said label on any of said complexes, wherein the presence of said label is indicative of the presence of a KLHL11 autoantibody in the biological sample and the absence of said label is indicative of the absence of a KLHL11 autoantibody in the biological sample. In some instances, the method comprises a combination of immunoprecipitation and Western blot analysis to detect the presence of a KLHL11 autoantibody in a biological sample from a male subject, as described in Example 5. For example, the method may comprise contacting a KLHL11 polypeptide or antigenic fragment or variant thereof with a biological sample from a male subject under conditions in which a complex is formed between the KLHL11 polypeptide or antigenic fragment or variant thereof and a corresponding KLHL11 autoantibody in the biological sample, if present; immunoprecipitating any complex formed between the KLHL11 polypeptide or antigenic fragment or variant thereof and a corresponding KLHL11 autoantibody in the biological sample to produce an immunoprecipitate comprising any such complex formed; separating components of the immunoprecipitate from each other (e.g., by electrophoresis), said components comprising the KLHL11 polypeptide or antigenic fragment or variant thereof and a corresponding KLHL11 autoantibody in the biological sample, if present; and contacting the components of the immunoprecipitate with a secondary antibody having a suitable label thereon that specifically binds to a constant region of the KLHL11 autoantibody, if present; and detecting the complex formed, if formed, by detecting the label of the secondary antibody, wherein the presence of the secondary antibody is indicative of the presence of a KLHL11 autoantibody in the biological sample, and wherein the absence of the secondary antibody is indicative of the absence of a KLHL11 autoantibody in the biological sample. For example, as shown in FIG. 4 and FIG. 5, an immunoprecipitation assay may be performed to detect the presence of KLHL11 autoantibodies in a subject by contacting recombinant KLHL11 protein with a biological sample from the subject, such as serum or CSF. Exemplary labels include any of the detectable labels described in this disclosure including, for example, fluorescent dyes and radioactive labels.

Figure 6:
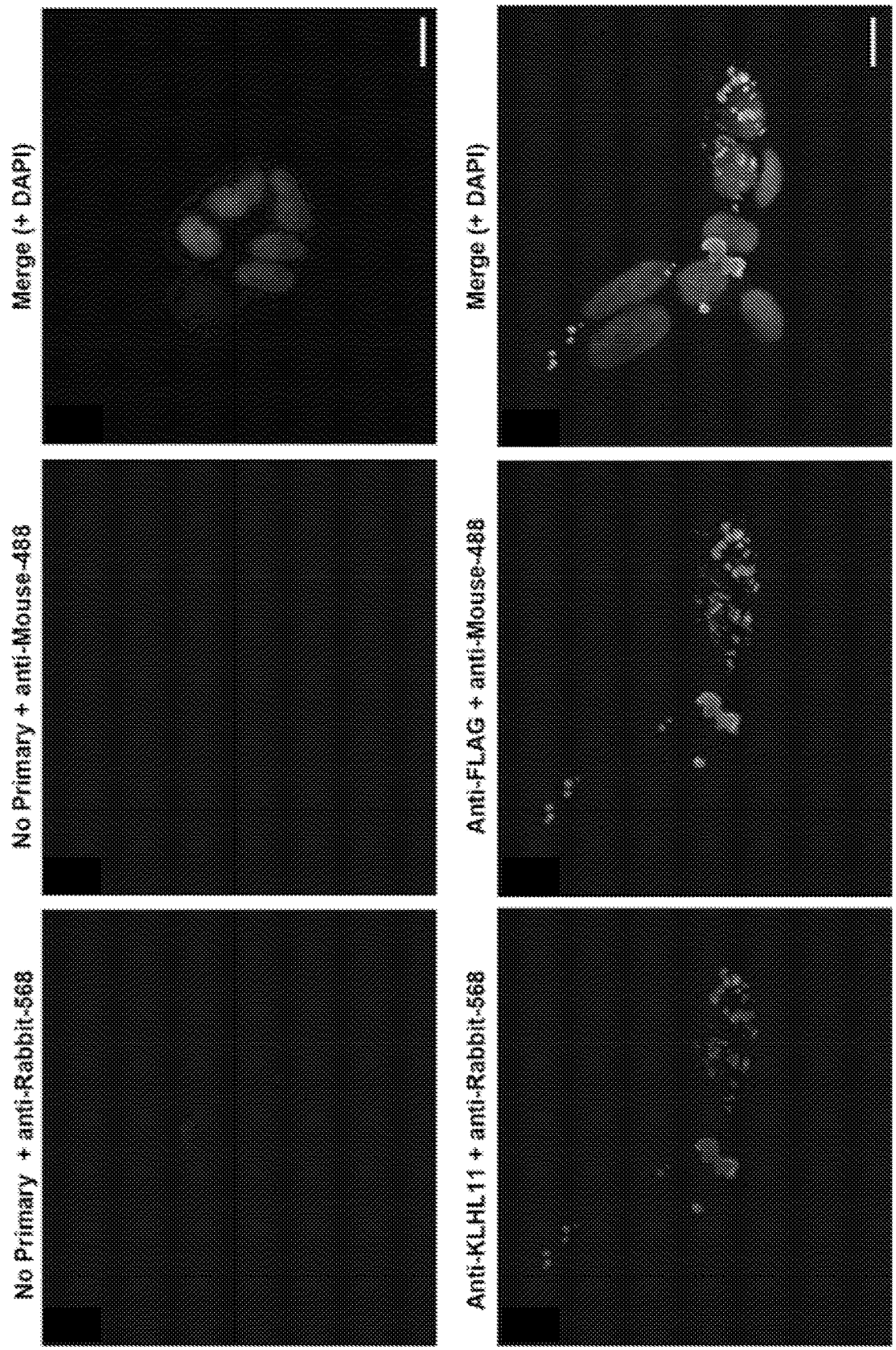
FIG. 6 shows validation of KLHL11 commercial antibody to detect overexpression of human KLHL11-myc-flag expression construct in a 293T cell-based expression assay according to aspects of this disclosure. The top row of images are second antibody-only controls. The bottom row of images were stained with primary anti-KLHL11 (rabbit) and anti-Flag (mouse) antibodies. Magnification 63×. Scale bar denotes 10 microns.
Figure 7:
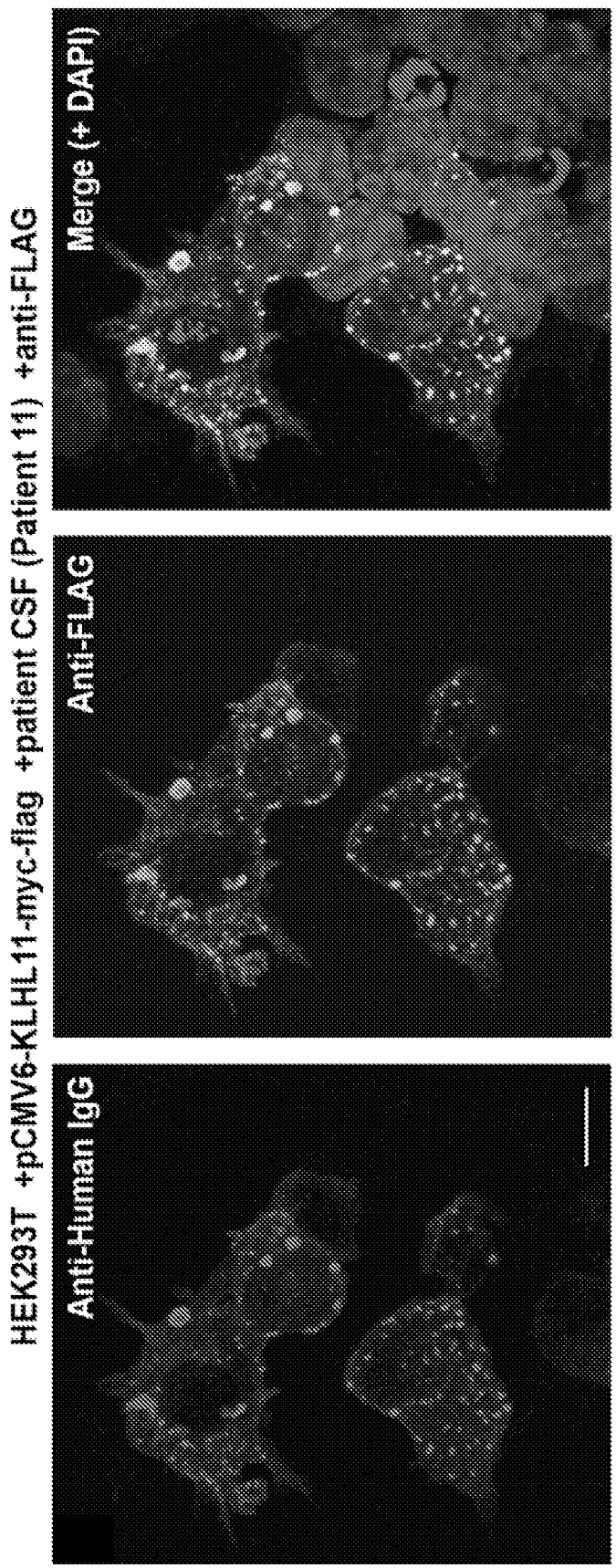
FIG. 7 shows co-localization of IF signal from patient 11 IgG and anti-Flag antibody in a cell-based KLHL11-myc-flag overexpression assay. The left and central images accurately reflect the observed staining patterns. The staining observed in the right panel is the bright punctate, globular, and diffuse staining for three cells which is overlaid on the nuclei-shaped DAPI staining. 100× magnification, scale bar denotes 10 microns.

In some embodiments, the KLHL11 polypeptide or antigenic fragment or variant thereof is heterologously-expressed on the surface of a cell. For example, a vector comprising the coding sequence of the KLHL11 polypeptide or antigenic fragment or variant thereof operably linked to a promoter can be introduced into a cell. The vector may comprise elements that cause the KLHL11 polypeptide or fragment thereof to be expressed on the surface of the cell. For example, the KLHL11 polypeptide fragments and variants thereof may be expressed as fusion proteins with a membrane protein on the surface of the cell. In some instances, the cell is a bacteria cell or a eukaryotic cell. For example, the eukaryotic cell may be a yeast cell or a mammalian cell such as a human cell. Methods of transfection and transduction of cells to introduce recombinant nucleic acids are well known in the art. For example, a 293T cell-based expression assay can be used to a KLHL11 commercial antibody, as shown in FIG. 6, as well as KLHL11 autoantibodies in a biological sample from a subject, such as serum or CSF, as shown in FIG. 7.

In some embodiments, an isolated, purified KLHL11 polypeptide or antigenic fragment or variant thereof may be used in the provided methods. Protein expression and purification methods are well known in the art. In some embodiments, the KLHL11 polypeptide has the sequence represented by UniProt/UniProtKB Database Entry Q9NVR0.1, which, as all sequence accession numbers referred to throughout this application, refers to the sequence deposited in the UniProtKB and NCBI databases, more specifically the version publicly available on Nov. 23, 2018 (SEQ ID NO:1). However, the teachings of the present invention may not only be carried out using polypeptides, in particular a polypeptide comprising the full-length sequence of KLHL11, having the exact amino acid residue sequences referred to in this application explicitly, for example by name, sequence or accession number, or implicitly, but also using fragments or variants of such polypeptides. Thus, modified KLHL11 polypeptides and antigenic fragments or variants thereof are also contemplated, such as those in which one or more amino acid residues are substituted or modified (such as with glutaraldehyde).

An "isolated" or "purified" polypeptide, or portion thereof, is substantially or essentially free from components that normally accompany or interact with the polypeptide or protein as found in its naturally occurring environment. Thus, an isolated or purified polypeptide or protein is substantially free of other cellular material, or culture medium when produced by recombinant techniques, or substantially free of chemical precursors or other chemicals when chemically synthesized. A protein that is substantially free of cellular material includes preparations of protein having less than about 30%, 20%, 10%, 5%, or 1% (by dry weight) of contaminating protein. When the KLHL11 polypeptide or antigenic portion thereof is recombinantly produced, optimally culture medium represents less than about 30%, 20%, 10%, 5%, or 1% (by dry weight) of chemical precursors or non-protein-of-interest chemicals.

Figure 3:
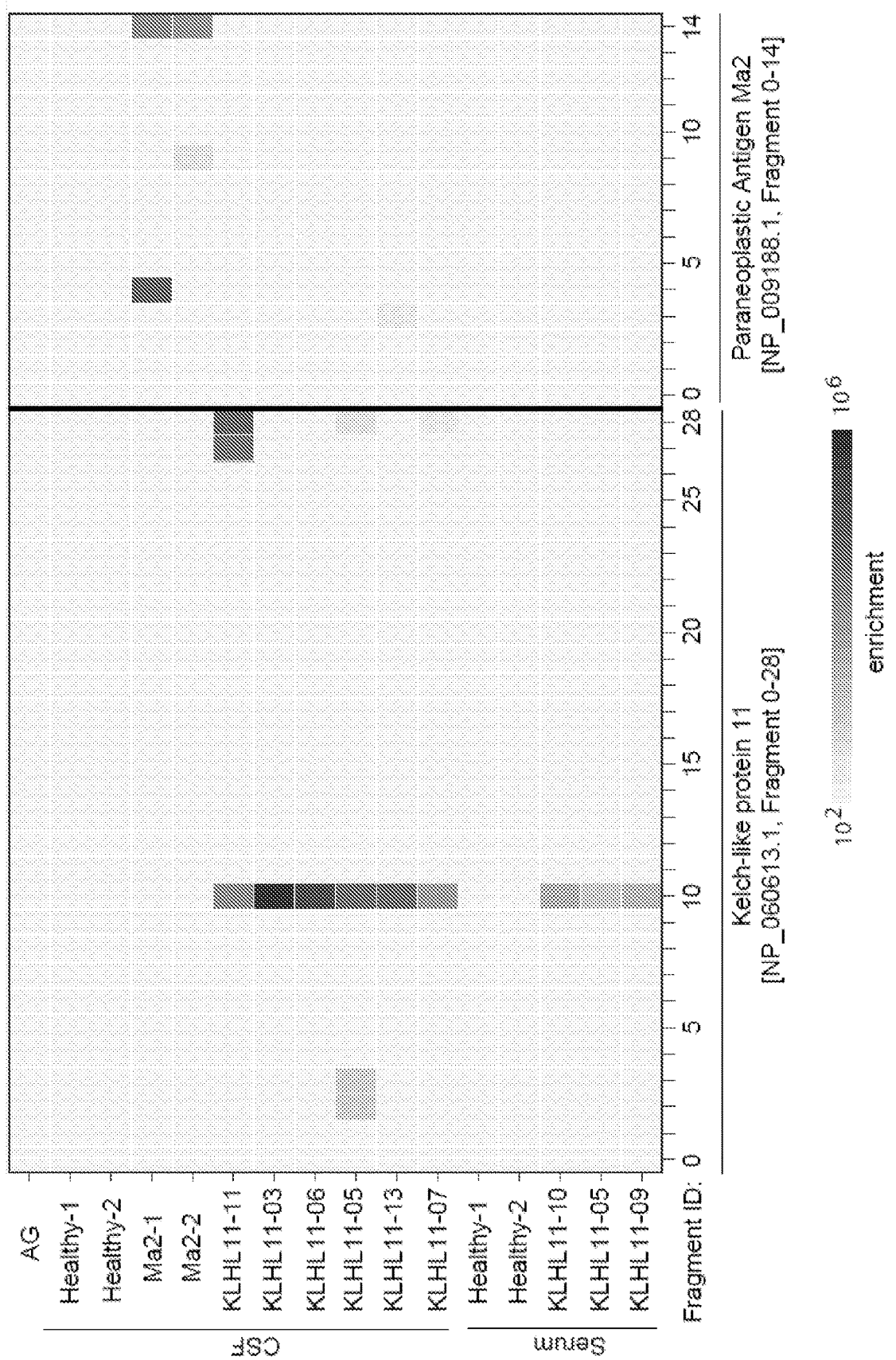
FIG. 3 shows epitope mapping of a common fragment of KLHL11, identified among the KLHL11 patients but not in protein A/G bead negative controls, healthy controls or anti-Ma2 encephalitis controls in immunoprecipitation experiments according to certain aspects of this disclosure. Note enrichment of fragment 10 by all KLHL11 patients, including serum and CSF.

The term "fragment" with regard to KLHL11 refers to an amino acid residue sequence of a portion of the full-length protein, encompassing, for example, an amino acid residue sequence that is truncated at one or both termini by one or more amino acids. The KLHL11 polypeptide fragment retains its antigenicity such that it is bound specifically under appropriate binding conditions by a KLHL11 autoantibody that would bind specifically to the corresponding full-length KLHL11 protein under appropriate binding conditions. An antigenic portion of the KLHL11 protein can be a polypeptide that is, for example, 10, 25, 50, 100, 150, 200, 250 or more amino acid residues in length of the full length KLHL11 protein. Alternatively or in addition, such peptide sequence may comprise one or more internal deletions of one or more amino acid residues. Thereby the residual length of the fragment equals or exceeds the length of one or more continuous or conformational epitopes, e.g., 6, 7, 8, 9, 10, 11, 12, 13, 14, 15, 16, 17, 18, 19, 20, 21, 22, 23, 24, 25, 26, 27, 28, 29, 30, 21, 32, 33, 34, 35, 36, 37, 38, 39, 40, 41, 42, 43, 44, 45, 46, 47, 48, 49, 50, 55, 60, 65, 70, 75, 80, 85, 90, 95, 100 or more amino acid residues. In some embodiments, a fragment comprises at least 6 contiguous amino acid residues of SEQ ID NO:1. In some embodiments, a fragment comprises at least 8 contiguous amino acid residues of SEQ ID NO:1. In some embodiments, a fragment comprises at least 12 contiguous amino acid residues of SEQ ID NO:1. In some embodiments, a fragment comprises 8-12 contiguous amino acid residues of SEQ ID NO:1. In some embodiments, a fragment comprises 30-60 contiguous amino acid residues of SEQ ID NO:1. In some embodiments, a fragment comprises 47 contiguous amino acid residues of SEQ ID NO:1, such as, for example, the sequences set forth in SEQ ID NOs:2-30 as identified in Table 1. In some instances, a plurality of fragments is provided, each fragment comprising 49 contiguous amino acid residues of SEQ ID NO:1 such as, for example, the fragments identified in Table 1. For example, a first fragment may comprise amino acid residues 1-49 of SEQ ID NO:1, a second fragment comprising amino acid residues 25-73, a third fragment comprising amino acid residues 49-97 of SEQ ID NO:1, and so on with each additional fragment having a first amino acid residue 22 amino acids downstream in the amino acid sequence of SEQ ID NO:1 relative to the first amino acid residue of the prior fragment. Antigenic KLHL11 polypeptide fragments include those comprising the sequence of any of SEQ ID NOs:2-30 or more than one thereof. In some embodiments, an antigenic fragment can comprise the sequence of one or more of SEQ ID NO:4 (peptide 2), SEQ ID NO:5 (peptide 3), SEQ ID NO:12 (peptide 10), SEQ ID NO:29 (peptide 27), or SEQ ID NO:30 (peptide 28), as shown in FIG. 3. In some embodiments, the antigenic KLHL11 polypeptide fragment has the sequence of SEQ ID NO:12. The person of skill in the art is familiar with guidelines used to design peptides having sufficient immunogenicity such as, for example, those described in Jackson, D. C., et al., Vaccine 18(3-4): 355-361 (1999) and Black, M., et al., Expert Rev. Vaccines, 9(2): 157-173 (2010). Briefly, it is desirable that the peptide meets as many as possible of the following requirements: (a) it has a high degree of hydrophilicity, (b) it comprises one or more residues selected from the group comprising aspartate, proline, tyrosine, and phenylalanine, (c) is has, for higher specificity, no or little homology with other known peptides or polypeptides, (d) it is sufficiently soluble, and (e) it comprises no glycosylation or phosphorylation sites unless required for specific reasons. Alternatively, bioinformatics approaches may be followed such as, for example, those described by Moreau, V., et al., BMC Bioinformatics 2008, 9:71 (2008). Such biologically active portions can be prepared by recombinant techniques and evaluated for pesticidal activity.

The term "variant" of KLHL11, or fragments thereof, refers to a polypeptide comprising an amino acid residue sequence that is at least 70, 75, 80, 85, 90, 92, 94, 95, 96, 97, 98 or 99% identical to the normal sequence of the KLHL11 protein, or a fragment thereof. Within the context of this disclosure, a variant of the KLHL11 protein, or a fragment thereof, retains its antigenicity such that it is bound specifically under appropriate conditions by a KLHL11 autoantibody that would specifically bind to the corresponding full length KLHL11 polypeptide under appropriate conditions. In some instances, variants are modified at amino acid residues other than those essential for the biological activity, for example the ability of an antigen to bind specifically to a KLHL11-specific antibody, such as a KLHL11 autoantibody. In some instances, one or more such essential amino acid residues may optionally be replaced in a conservative manner or additional amino acid residues may be inserted such that the biological activity (i.e. antigenicity) of the variant polypeptide is preserved. Methods of alignment of sequences for comparison are well known in the art, e.g., visual alignment or using publicly available software using known algorithms to achieve maximal alignment. The state of the art comprises various methods that may be used to align two given nucleic acid or amino acid sequences and to calculate the degree of identity, see for example Arthur Lesk (2008), Introduction to bioinformatics, Oxford University Press, 2008, 3rd edition. In a preferred embodiment, the ClustalW software (Larkin, M. A., Blackshields, G., Brown, N. P., Chenna, R, McGettigan, P. A., McWilliam, H., Valentin, F., Wallace, I. M., Wilm, A., Lopez, R., Thompson, J. D., Gibson, T. J., Higgins, D. G. (2007). Clustal W and Clustal X version 2.0. Bioinformatics, 23, 2947-2948) is used. Alternatively, alignment of sequences for comparison can be conducted, for example, by the local homology algorithm of Smith and Waterman (*Adv. Appl. Math.* 2:482, 1970), by the homology alignment algorithm of Needleman and Wunsch (*J. Mol. Biol.* 48:443, 1970), by the search for similarity method of Pearson and Lipman (*Proc. Natl. Acad. Sci. USA* 85:2444, 1988), by computerized implementations of these algorithms (e.g., GAP, BESTFIT, FASTA, and TFASTA in the Wisconsin Genetics Software Package, Genetics Computer Group, 575 Science Dr., Madison, Wis.), or by manual alignment and visual inspection (see, e.g., Ausubel et al., *Current Protocols in Molecular Biology* (1995 supplement)). Other publicly available software useful for alignment analysis include BLAST programs, ALIGN, ALIGN-2 (Genentech, South San Francisco, Calif.), and Megalign (DNASTAR).

Such variants of KLHL11 and fragments thereof may be prepared, for example, by introducing deletions, insertions or substitutions in nucleic acid sequences encoding them, or by chemical synthesis or modification. Moreover, variants of KLHL11 and fragments thereof may also be generated by fusion with other known polypeptides or variants thereof and encompass active portions or domains, preferably having a sequence identity of at least 70, 75, 80, 85, 90, 92, 94, 95, 96, 97, 98 or 99% when aligned with the active portion of the reference sequence, wherein the term "active portion", as used herein, refers to an amino acid sequence, which is less than the full length amino acid sequence or, in the case of a nucleic acid sequence, codes for less than the full length amino acid sequence, respectively, but retains at least some of the biological activity. For example, an active portion an antigenic polypeptide retains the ability to bind to an antibody or autoantibody and, preferably, when administered to mammals, causes an immune response to occur.

The one or more KLHL11 polypeptides and antigenic fragments and variants thereof may be provided in any form and at any degree of purification, from tissues or cells comprising said polypeptides in an endogenous form, such as cells overexpressing the polypeptide and crude or enriched lysates of such cells, to purified and/or isolated polypeptides that are essentially pure. In embodiments, the one or more KLHL11 polypeptides or antigenic fragments or variants thereof have a native configuration, wherein the term "native configuration", as used herein, refers to a folded polypeptide, such as a folded polypeptide purified from tissues or cells, such as mammalian cells or tissues or from non-recombinant tissues or cells. In another embodiment, the one or more KLHL11 polypeptides or antigenic fragments or variants thereof are recombinant proteins, wherein the term "recombinant", as used herein, refers to a polypeptide produced using genetic engineering approaches at any stage of the production process, for example by fusing a nucleic acid encoding the polypeptide to a strong promoter for overexpression in cells or tissues or by engineering the sequence of the polypeptide itself. Such techniques are well known in the art.

In some instances, the one or more KLHL11 polypeptides or antigenic fragments or variants thereof can be denatured such as by heating, freezing or ultraviolet ray, or chemical treatments such as a surfactant or a denaturant. For example, such a denatured form may be prepared by treating them with sodium dodecyl sulfate (SDS) or dithiothreitol (DTT). KLHL11 polypeptides or antigenic fragments or variants thereof that are included in a kit or a panel as described herein can be provided within a cell, in a solution in which they are soluble, or the KLHL11 polypeptides or fragments or variants thereof can be provided in a lyophilized form.

In some embodiments, the one or more KLHL11 polypeptides or antigenic fragments or variants thereof can be immobilized on a solid carrier insoluble in an aqueous solution, such as via a covalent bond, electrostatic interactions, encapsulation or entrapment, for example by denaturing a globular polypeptide in a gel, or via hydrophobic interactions such as via one or more covalent bonds. Various suitable carriers, for example paper, metal, silicon or glass surfaces, microfluidic channels, membranes, beads such as magnetic beads, column chromatography media, biochips, polyacrylamide gels and the like have been described in the literature, for example in Kim, D., Herr, A. E. (2013), Protein immobilization techniques for microfluidic assays, Biomicrofluidics 7(4), 041501. This way, the immobilized molecule, together with the insoluble carrier, may be separated from an aqueous solution in a straightforward manner, for example by filtration, centrifugation or decanting. An immobilized molecule may be immobilized in a reversible or irreversible manner. For example, the immobilization is reversible if the molecule interacts with the carrier via ionic interactions that can be masked by addition of a high concentration of salt or if the molecule is bound via a cleavable covalent bond such as a disulfide bridge which may be cleaved by addition of thiol-containing reagents. By contrast, the immobilization is irreversible if the molecule is tethered to the carrier via a covalent bond that cannot be cleaved in aqueous solution, for example a bond formed by reaction of an epoxide group and an amine group as frequently used to couple lysine side chains to affinity columns. The protein may be indirectly immobilized, for example by immobilizing an antibody or other entity having affinity to the molecule, followed by formation of a complex to the effect that the molecule-antibody complex is immobilized. Various ways to immobilize molecules are described in the literature such as, for example, in Kim and Herr (2013). In addition, various reagents and kits for immobilization reactions are commercially available such as, for example, from Pierce Biotechnology.

In some embodiments, the KLHL11 polypeptide or fragment thereof is present in a tissue section, and the method comprises contacting a tissue section with a biological sample and a detectably-labeled secondary antibody under conditions in which a complex is formed between KLHL11 polypeptides in the tissue section, a corresponding KLHL11 autoantibody in the biological sample, if present, and the detectably-labeled secondary antibody; and (b) identifying a pattern of complex formation in the tissue sample by detecting the detectably-labeled secondary antibody, wherein the presence of a pattern of complex formation is indicative of the presence of KLHL11 autoantibodies in the biological sample, and wherein the absence of a pattern of complex formation is indicative of the absence of KLHL11 autoantibodies in the biological sample.

Figure 1B:
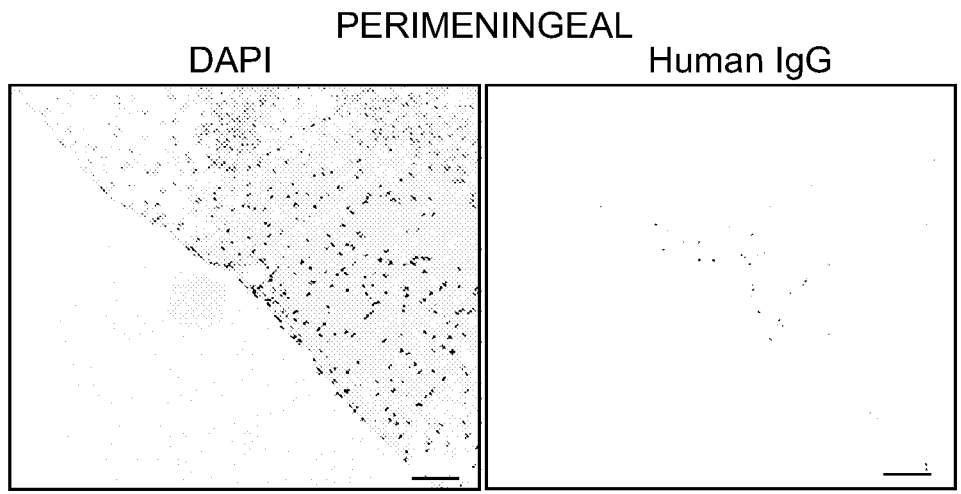
Figure 1B:
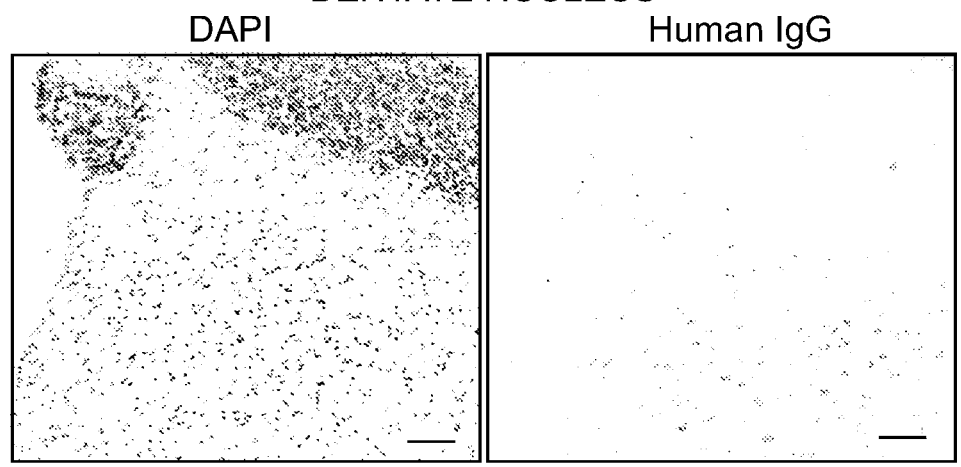
Figure 1B:
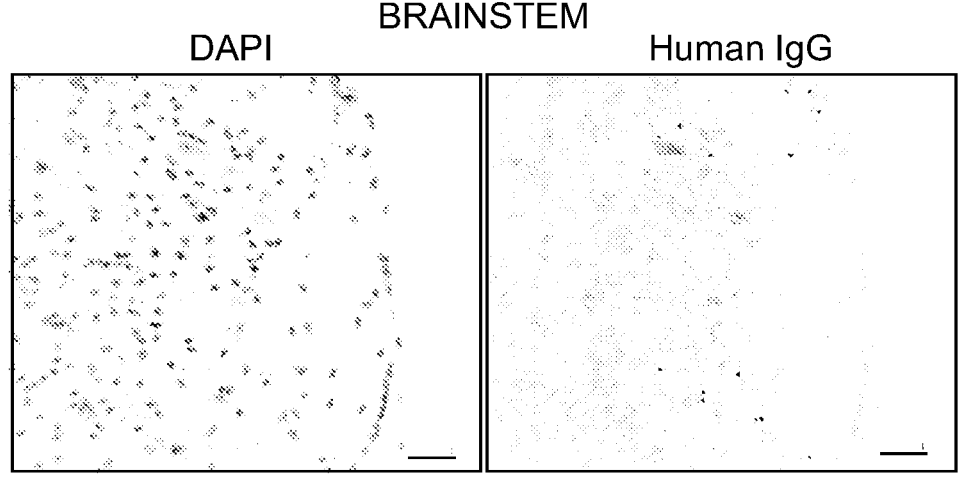

In some embodiments, the three components—the tissue section, the biological sample, and the detectably-labeled secondary antibody—are combined under conditions in which a complex is formed between KLHL11 polypeptides in the tissue section, and a corresponding KLHL11 autoantibody in the biological sample, if present, and the detectably-labeled secondary antibody. Using the detectable label and appropriate detection means, the pattern of complex formation within the tissue sections is identified. The pattern of complex formation within the tissue sections is directly related to the cellular location(s) of the antigen (e.g., an antigenic KLHL11 polypeptide) bound by an autoantibody, when present, in the biological sample. As described herein, the presence of a particular pattern of complex formation in one or more types of tissue indicates the presence of KLHL11 autoantibodies in the biological sample. As described herein, when tissue sections of brain tissue are used with a biological sample that includes one or more KLHL11 autoantibodies, staining, which represents complex formation, is observed sparsely yet widespread throughout the brain, including the hippocampus, cerebral cortex, cerebellum, midbrain, and brain stem, and is enriched in perivascular tissue, perimeningeal tissue, and white matter tracts as illustrated in FIG. 1 and FIG. 1B. Similar staining patterns are seen in the corpus callosum, dentate gyrus, piriform cortex, medulla to pons, and medulla (data not shown). For example, as shown in FIG. 8, staining by a biological sample (CSF) from specific male subjects presenting with neurological symptoms as described herein was observed in the piriform cortex of rat brain tissue. This pattern of complex formation is herein designated as the "Sparkles" pattern. Those skilled in the art would understand that the absence of a particular staining pattern (or the presence of non-specific staining) typically indicates the absence of any KLHL11 autoantibodies in the biological sample, provided the proper controls have been performed.

As the "Sparkles" staining pattern described herein is novel, particularly with respect to KLHL11-associated autoimmune diseases, compositions including tissue sections (e.g., brain) are provided herein. Such tissue samples, following immunohistochemistry with a biological sample that contains one or more KLHL11 autoantibodies, exhibit the staining pattern described herein. Alternatively, a composition is provided that includes tissue sections (e.g., brain) and a description of the staining pattern described herein such that, a person of ordinary skill, after performing the immunohistochemistry methods, could identify the presence of the staining pattern described herein and, thus, the likely presence of KLHL11 autoantibodies.

In instances where the KLHL11 polypeptide and antigenic fragment or variant thereof is in a phage display or eukaryotic cell display library, the presence of a KLHL11 autoantibody in a biological sample from a male subject is assessed by contacting the biological sample with a phage display or eukaryotic cell display library. An appropriate display library includes a plurality of eukaryotic cells or phage that express a plurality of peptides including KLHL11 polypeptide fragments and variants thereof (see discussion in Section B below regarding fragments and variants) on the surface of the eukaryotic cells or phage. For example, the KLHL11 polypeptide fragments and variants thereof may be expressed as fusion proteins with a membrane protein on the surface of the eukaryotic cells or phage. Each cell or phage in the library expresses a different peptide. In some instances, the eukaryotic cell may be a yeast cell or a mammalian cell such as a human cell. The biological sample can be assayed to detect whether there is specific protein-protein interaction with any of the peptides expressed on the surface of the eukaryotic cells or phage. Methods of detecting protein-protein interactions using phage display are well-known in the art. For example, the putative immunogen may be bound to a solid support and the phage library applied thereto. After washing the solid support, any phage that remain bound to the solid support may express a KLHL11 autoantibody that can binding specifically to a KLHL11 polypeptide fragment or variant thereof. The phage DNA is isolated (after bacterial amplification) and sequenced to identify the sequence of the peptide expressed by the phage. Such peptides may then be further assessed individually for specific binding to the putative immunogen such as, for example, by immunoprecipitation, Western blot, or other immunoassay. In some instances, where the display library comprises eukaryotic cells, specific protein-protein interaction with any of the peptides may be assessed by flow cytometry. In some instances, the eukaryotic cells of the display library may be yeast cells. In some instances, the eukaryotic cells of the binding pool may be mammalian cells such as human cells. The peptides expressed on the cells of the display library may be fluorescently labeled (see discussion above regarding detectably-labeled secondary antibodies for exemplary fluorescent labels). The biological sample and the display library may be combined, and FACS analysis performed to identify cells that express peptides that are bound specifically to a KLHL11 autoantibody. In some instances, the identified cells may then be expanded in vitro, and the DNA or the RNA analyzed, such as by next generation sequencing. In some instances, single cell PCR may be performed followed by RNA and/or DNA sequence analysis. Other exemplary methods for assessing protein-protein interactions between a biological sample that contains a KLHL11 autoantibody and a display library include those described in Jardine, J., et al., 2013, Science 340 (6133):711-716 and McGuire, A. T., et al., 2014, J. of Virology 88(5):2645-2657, both of which are incorporated by reference in their entireties herein. In one embodiment, the phage display system described in Example 1 may be used.

In some instances, more than one of the detection methods described above may be used in a complementary manner for more reliable results. In some embodiments, other immunoassays can be performed either in alternative to or before and/or after the immunohistochemistry methods. For example, a Western blot may be performed using, for example, a panel of known antigens associated with autoantibodies, the panel including a KLHL11 polypeptide or antigenic fragment or variants thereof, the results of which may warrant further evaluation using, for example, the immunohistochemistry methods described herein. In another example, an immunohistochemistry method as described herein may be performed, followed by a Western blot in order to, for example, further confirm the specific antigens, including the KLHL11 polypeptide, recognized by the autoantibodies in the biological sample. In another example, a phage or eukaryotic cell display library that includes a plurality of eukaryotic cells or phage that express a plurality of peptides including KLHL11 polypeptide fragments and variants thereof on the surface of the eukaryotic cells or phage may be used to assess for the presence of KLHL11 autoantibodies in the biological sample from the male subject, and then followed by a radioligand binding assay method or an immunohistochemistry method as described herein for confirmation, such as by detecting the "Sparkles" pattern of complex formation in a tissue section of brain tissue. In another example, the biological sample may be assessed by a radioligand binding assay method first, with confirmation by assessing the sample using a phage or eukaryotic cell display library.

Any data demonstrating the presence or absence of a KLHL11 autoantibody and the KLHL11 polypeptide or antigenic fragment or variant thereof may be correlated with reference data. For example, detection of a KLHL11 autoantibody indicates that the male subject who provided the sample analyzed has or is at risk of developing testicular cancer or a premalignant testicular condition. If the male subject has been previously diagnosed, the amount of KLHL11 autoantibodies detected at the time of prior diagnosis and in the present time may be correlated to find out about the progression of the disease and/or the success of a treatment. For example, if the amount of KLHL11 autoantibodies is found to increase, it may be concluded that the disease is progressing and/or that any treatment attempted is unsuccessful.

Kits and devices useful for performing the methods of Section A are described below in Section B.

B. Kits and Devices

In another aspect, provided in this disclosure are kits and panels containing one or more KLHL11 polypeptides or antigenic fragments or variants thereof to which KLHL11 autoantibodies can specifically bind. The polypeptide used in the kits and panels is preferably designed such that it is immunogenic, particularly that it binds to KLHL11 autoantibodies from subjects. In some instances, the kits include a panel as provided herein, such as a diagnostic panel.

In certain embodiments, a kit as described herein includes one or more solubilizing agents for increasing the solubility of a polypeptide such as, for example, a buffer solution. The kit may further include reagents provide a detectable signal when used in conjunction with the KLHL11 polypeptides or fragments or variants thereof and a biological sample. In some embodiments, the kit includes a detectably-labeled secondary antibody that is able to bind to a KLHL11 autoantibody specifically binding to said one or more KLHL11 polypeptides or fragments or variants thereof. Reagents for the detection of the secondary antibody label can also be included in the kit. The secondary antibody is detected by a method that depends on a labeling group used. Exemplary labels for secondary antibodies are described above in this disclosure.

In addition, a kit can include directions for using the KLHL11 polypeptides or fragments or variants thereof and/or directions for practicing a method described herein; particularly, detecting KLHL11 autoantibodies in a biological sample. The concentration or amount of KLHL11 autoantibodies contained in the biological sample is indirectly measured by measuring the amount of the detectable label. The obtained measurement value may be converted to a relative or absolute concentration, amount, activity, etc. using a calibration curve or the like.

In some embodiments, a kit or a panel as provided herein includes a reference sample, such as a normal control sample, a testicular cancer control sample, or both. In some embodiments, a kit or a panel as provided herein includes one or more control antibody that detects an antigen that is expected to be present in a biological sample such as, for example, a biological sample from a healthy male subject, a biological sample from a male subject with testicular cancer or a premalignant testicular condition. If such a sample is included, the obtained measurement values for such sample are compared with the results of the test sample, so that the presence or absence of testicular cancer or a premalignant condition in the male subject can be more objectively determined.

In addition to the one or more KLHL11 polypeptides, fragments, and/or variants, the panel can include additional polypeptides such as, for example, positive or negative controls or other antigens known to bind to autoantibodies of diagnostic value, particularly those related other neurological diseases, including neurodegenerative disease and paraneoplastic neurologic syndromes. For example, the panel can include any of antigens for neuronal nuclear autoantibodies (such as one or more of ANNA-1, ANNA-2, ANNA-3), antigens for anti-glial/neuronal nuclear autoantibodies (such as AGNA-1/Sox1), antigens for neuronal and muscle cytoplasmic autoantibodies (such as one or more of PCA-1, PCA-2, PCA-Tr, CRMP-5, amphiphysin, and striational), antigens of plasma membrane cation channel autoantibodies, antigens of calcium channel autoantibodies, antigens of P/Q-type and N-type calcium channel autoantibodies, antigens of dendrotoxin-sensitive potassium channel autoantibodies, or antigens of neuronal (ganglionic) and muscle nicotinic acetylcholine receptor (AChR) autoantibodies. In one embodiment, the panel includes antigens for neuronal nuclear autoantibodies. In another embodiment, the panel includes antigens for neuronal and muscle cytoplasmic autoantibodies. In another embodiment, the panel includes antigens for anti-glial/neuronal nuclear autoantibodies. In another embodiment, the panel includes antigens for neuronal and muscle cytoplasmic autoantibodies. In another embodiment, the panel includes antigens for autoantibodies of any of plasma membrane cation channels, calcium channels, P/Q-type and N-type calcium channels, dendrotoxin-sensitive potassium channels, or neuronal (ganglionic) and muscle nicotinic acetylcholine receptors (AChR).

In one aspect, provided herein is a medical or diagnostic device comprising a panel as described above, the panel including one or more KLHL11 polypeptides or antigenic fragments or variants thereof. In some embodiments, such a medical or diagnostic panel device comprises one or more KLHL11 polypeptides, fragments, or variants in a form as described above that allows contacting it with an aqueous solution, more preferably the liquid human sample, in a straightforward manner. In particular, the one or more KLHL11 polypeptides, fragments, or variants may be immobilized on the surface of a carrier, which carrier comprises, but is not limited to glass plates or slides, biochips, microtiter plates, beads, for example magnetic beads, chromatography columns, membranes or the like. Exemplary devices include line blots, microtiter plates and biochips. In some embodiments, the device can include additional polypeptides such as, for example, positive or negative controls or other antigens known to bind to autoantibodies of diagnostic value, particularly those related other neurological diseases, including neurodegenerative disease and paraneoplastic neurologic syndromes as discussed above.

C. Medical Methods

In one aspect, provided are methods of diagnosing a male subject presenting with rhomboencephalitis with testicular cancer or a premalignant testicular condition. In some embodiments, the male subject is also diagnosed with paraneoplastic encephalitis. The methods comprise detecting the presence of KLHL11 autoantibodies in a biological sample from the male subject using an in vitro detection method, particularly methods using immunohistochemical detection of the KLHL11 autoantibodies. In some embodiments, a male subject that is determined to be serologically positive for a KLHL11 autoantibody is diagnosed as having a testicular cancer or a premalignant testicular condition and paraneoplastic encephalomyelitis. In some embodiments, the methods include a step of performing an examination of the male subject to determine the presence of testicular cancer or a premalignant testicular condition in the male subject. Any of the detection methods, kits, or devices discussed above in Sections A and B may be used.

In another aspect, provided are methods of treating a male subject having testicular cancer or a premalignant testicular condition and paraneoplastic encephalomyelitis, wherein the male subject produces one or more Kelch-like protein 11 (KLHL11) autoantibodies (i.e. a KLHL11 autoantibody is present in at least type of biological sample from the subject) and presenting with rhomboencephalitis. In some embodiments, the presence of a KLHL11 autoantibody in the biological sample indicates that the subject has, or is at risk of having, testicular cancer or a premalignant testicular condition and paraneoplastic encephalomyelitis. In some embodiments, the method include a step of detecting the presence or absence of a KLHL11 autoantibody in a biological sample from the male subject. In some embodiments, the male subject is seropositive for a KLHL11 autoantibody. The provided methods include a step of performing an examination of the male subject to determine the presence of testicular cancer or a premalignant testicular condition in the male subject, wherein the male subject produces a KLHL11 autoantibody. The provided methods also include a step of administering an immunosuppressive therapy to the male subject. In some embodiments, the male subject is determined to have testicular cancer or a premalignant testicular condition and is also administered a treatment for testicular cancer or the premalignant testicular condition. The provided methods are of use for male subjects presenting with rhomboencephalitis as discussed above in Section A. Any of the detection methods, kits, or devices discussed above in Sections A and B may be used to detect a KLHL11 autoantibody in a biological sample from the male subject. The treatment administered to the male subject can be any of the treatments discussed below or are otherwise appropriate for the type and/or stage of testicular cancer and/or the presenting autoimmune neuropathies.

In another aspect, provided are methods for treating a male subject having testicular cancer or a premalignant testicular condition and paraneoplastic encephalomyelitis, wherein said method comprises administering to a male subject identified as being serologically positive for a KLHL11 autoantibody an immunosuppressive therapy and, if the male subject has testicular cancer or a premalignant testicular condition, a treatment for testicular cancer or the premalignant testicular condition. The treatment administered to the male subject can be any of the treatments discussed below or are otherwise appropriate for the type and/or stage of testicular cancer and/or the presenting autoimmune neuropathies. The male subject may be identified as serologically positive for a KLHL11 autoantibody using any of the detection methods, kits, or devices discussed above in Sections A and B.

In some embodiments, as discussed in detail above in Section A, the male subject has one or more of an elevated CSF protein count; blood cells present in his CSF, particularly leukocytes; an elevated CSF index; two or more cerebrospinal oligoclonal bands; or at least one risk factor for testicular cancer.

In some embodiments, the male subject has not been previously diagnosed or treated for testicular cancer, such as seminoma, or a premalignant condition such as one or more of pretesticular microlithiasis, testicular atrophy, or testicular fibrosis. In such instances the provided methods are useful for directing a focused search for testicular cancer.

In some embodiments, the male subject was previously treated for testicular cancer, such as, for example, seminoma, or a pre-malignant condition such as, for example, pretesticular microlithiasis, testicular atrophy, or testicular fibrosis. In such instances the provided methods are useful for investigating neurological symptoms that appear after cancer therapy and are not explainable by metastasis. The provided methods are also useful for detecting early evidence of cancer recurrence in previously seropositive patients.

In some instances, the male subject is being treated for testicular cancer, such as, for example, seminoma, or a pre-malignant condition such as, for example, pretesticular microlithiasis, testicular atrophy, or testicular fibrosis. In such instances the provided methods are useful for investigating neurological symptoms that appear in the course of cancer therapy and are not explainable by metastasis. In some embodiments, the male subject is being treated with chemotherapy. In such instances, the provided methods are useful for differentiating autoimmune neuropathies from neurotoxic effects of chemotherapy. In some instances, the provided methods are also useful for monitoring the immune response of seropositive patients in the course of cancer therapy.

The presence (or absence) of a KLHL11 autoantibody in a biological sample from a male subject presenting with encephalitis is detected using any of the methods, kits, or devices described in Sections A and B. Detection of the KLHL11 autoantibody in the biological sample indicates that the subject has paraneoplastic encephalomyelitis. In some embodiments, an examination of the subject is performed to determine the presence of testicular cancer or a premalignant testicular condition in the male subject. In some embodiments, the examination may be one or more of a scrotal ultrasound examination, whole body imaging with computerized tomography, magnetic resonance imaging, or positron emission tomography.

An immunosuppressive therapy is administered to the male subject to treat the paraneoplastic encephalomyelitis. Immunosuppressive therapies are therapies that lower the activity the body's immune system. Such therapies are useful to treat conditions in which the immune system is overactive, such as autoimmune diseases (e.g., paraneoplastic encephalomyelitis). The immunosuppressive therapy administered to the male subject includes at least one of an immunosuppressant drug, intravenous immunoglobulin administration, plasma exchange plasmapheresis, or immunoadsorption. A discussion of suitable therapies is provided by Shin, Y-W., el al., 2018 *Ther. Adv. Neurol. Disord.* 11: 1756285617722347, published online Aug. 26, 2017 (doi: 10.1177/1756285617722347). For example, first-line immunosuppressive therapy can include corticosteroids, intravenous immunoglobulin, plasma exchange plasmapheresis, and immunoadsorption. In some instances, second-line immunosuppressive therapy may be need to be administered. Exemplary second-line immunosuppressive therapy is treatment with immunosuppressant drugs such as rituximab and cyclophosphamide.

Immunosuppressant drugs include corticosteroids (such as prednisone, budesonide, prednisolone), Janus kinase inhibitors (such as tofacitinib), calcineurin inhibitors (such as cyclosporine, tacrolimus), mTOR inhibitors (such as sirolimus, everolimus), IMDH inhibitors (such as azathioprine, lefunomide, mycophenolate), monoclonal antibodies (such as basiliximab, daclizumab, muromonab, adalimumab, certolizumab, etanercept, golimumab, infliximab, ixekizumab, natalizumab, rituximab, secukinumab, tocilizumab, ustekinumab, vedolizumab), and other biologics (such as abatacept, anakinra). Therapeutic targets for these immunosuppressant drugs include B cells and short-lived plasma cells (rituximab) and specific cytokines associated in the autoimmune and inflammatory process (tocilizumab and low-dose interleukin (IL)-2). Antiproliferative agents targeting lymphocyte proliferation (cyclophosphamide, azathioprine, mycophenolate mofetil, etc.) can also be used in refractory cases or to maintain remission.

In some instances, the male subject is administered corticosteroids. Corticosteroids act to broadly inhibit the inflammatory process and possess less specificity for the antibody-mediated immune process. Corticosteroids bind to intracellular glucocorticoid receptors and suppress the transcription of multiple proinflammatory genes that encode cytokines, chemokines, adhesion molecules, inflammatory enzymes, receptors and proteins. Glucocorticoids have an influence on almost all cytokines, and their use results in the depletion of T cells, inhibition of Th1 differentiation, macrophage dysfunction, and eosinophil apoptosis. At higher concentration, corticosteroids have additional effects on the synthesis of anti-inflammatory proteins, and also induce post-transcriptional effects. Furthermore, corticosteroids offer extra benefit to CNS inflammatory disorders by restoring BBB integrity and controlling brain edema.

Intravenous immunoglobulin (IVIg) is a blood product extracted from the collected pool of plasma from over a thousand donors. IVIg provides antibodies to a broad range of pathogens, and is used to provide passive immunity for patients with immunodeficiency. High-dose IVIg (1-2 g/kg) provide various anti-inflammatory and immunomodulatory effects by multidirectional mechanisms such as autoantibody neutralization, blockade of activating FcγR, and upregulation of inhibitory FcγRIIB, inhibition of complements, cytokines, and leukocyte migration. In some instances, IVIg is administered as a monotherapy. In some instances, after or in combination with high-dose steroids, or with plasma exchange plasmapheresis, rituximab, or other immunotherapeutic agents.

Plasma exchange plasmapheresis (also referred to as PLEX) removes autoantibodies and other pathologic substances in the plasma. PLEX also alters the immune system by changing lymphocyte numbers and their distribution, T-suppressor cell function, and T-helper cell phenotypes. Steroids alone can be insufficient to ameliorate autoantibody-mediated immune process, and direct removal or neutralization of autoantibodies from the circulation by PLEX and IVIg may show a synergistic effect. In addition, PLEX increases the proliferation of antibody-producing cells and this could increase susceptibility of these cells to immunosuppressants and chemotherapeutic agents. Immunoadsorption is a refined form of PLEX that enables the selective removal of Igs from separated plasma through high-affinity adsorbers (e.g., Protein A).

In some instances, the subject can be treated with an immunosuppressive therapy comprising oral administration of KLHL11 polypeptide or immunogenic fragments thereof. Such therapy is terms oral tolerization and involves treatment of by feeding to the subject the autoantigen inducing the immune response in order to suppress the immune response by invoking oral tolerance.

In some embodiments, a treatment for testicular cancer or the premalignant testicular condition is administered to the male subject. For example, such treatment is administered when examination of the male subject identifies the presence of testicular cancer or a premalignant testicular condition.

In some instances, the physical examination confirms that the male subject has seminoma. In all instances where seminoma is identified, the male subject is treated with orchiectomy in which one or both testes is surgically removed. In some instances, a radical inguinal orchiectomy is performed in which one or both testes and the spermatic cord is surgically removed. Depending on the stage of the seminoma, additional treatments are administered to the male subject.

In some embodiments, the male subject is treated with chemotherapy. The chemotherapeutic drugs are usually administered intravenously (IV) and are administered in cycles, with each period of treatment followed by a rest period to allow the body time to recover. Cycles generally last about 3 to 4 weeks. The main drugs used to treat testicular cancer are cisplatin, etoposide, bleomycin, ifosfamide, paclitaxel, and vinblastine. In some instances, using two or more drugs can be more effective than using any single drug alone. The chemotherapy regimens most commonly used as the first treatment for testicular cancer are: bleomycin, etoposide, and cisplatin (BEP or PEB); etoposide and cisplatin (EP); and etoposide or vinblastine plus ifosfamide, mesna, and cisplatin (VIP).

For example, for Stage I seminomas, the male subject can be treated with radiation aimed at para-aortic lymph nodes. Seminoma cells are sensitive to radiation and, thus, low doses can be used. Alternatively, the subject may be treated with chemotherapy, such as, for example one or two cycles with the drug carboplatin after surgery. If the seminoma is Stage IS seminomas and one or more of tumor marker levels are still high after the testicle containing the seminoma has been removed, the subject may be treated with chemotherapy.

In another example, for Stage IIA seminomas, after radical inguinal orchiectomy, the male subject can be treated with radiation to the retroperitoneal lymph nodes. These are the lymph nodes at the back of the abdomen. Usually stage II seminomas are given higher doses of radiation than stage I seminomas. Another option is chemotherapy such as, for example, with either four cycles of EP or three cycles of BEP.

In another example, Stage IIB seminomas have spread to cause larger lymph nodes or have spread to many different lymph nodes. The male subject can be treated with chemotherapy, such as, for example, four cycles of EP or three cycles of BEP. Radiation may be an option instead of chemotherapy if the lymph nodes are not enlarged from cancer spread.

In another example, for Stage IC seminomas, the male subject can be treated with chemotherapy, such as, for example, four cycles of EP or three to four cycles of BEP. Radiation therapy is generally not used for stage IC seminoma.

In another example, Stage III seminomas have spread beyond the testicles. In some instances, the male subject can be treated with four cycles of EP or three to four cycles of BEP. If the cancer is seminoma that has spread to the bones, liver, or brain, it is considered intermediate risk and the male subject can be treated with VIP. In some instances, if the male subject has very high levels of the tumor marker human chorionic gonadotropin (HCG), distant spread of cancer is seen on scans, and there is a high suspicion that the male subject might have a testicular choriocarcinoma, treatment of the male subject with chemotherapy may be started without a biopsy or surgery to remove the testicle. In some instances, if the cancer has spread to the brain, the male subject can be treated with surgery (for example, if there are only one or two tumors in the brain), radiation therapy aimed at the brain, or both. If the tumors in the brain are not bleeding or causing symptoms, treatment of the male subject with chemotherapy may be started first in some instances. Once chemotherapy is complete, the male subject should be evaluated for the presence of tumors and tumor markers. If the male subject has normal scans and normal tumor marker levels, the male subject can be monitored as discussed below and may not need further treatment. If additional tumors remain after chemotherapy, such as in the lung or in the retroperitoneal lymph nodes, further treatment at this point depends on whether the tumor is detectable on a PET scan. If the tumor is not detectable on a PET scan, the male subject can be monitored for tumor growth. If the tumor is detectable on a PET scan, the male subject can be treated with surgery (such as a retroperitoneal lymph node dissection) or chemotherapy using a different combination of drugs. In some instances, where the cancer is resistant to chemotherapy or has spread to many organs, the male subject can be treated with a high-dose chemotherapy regimen followed by a stem cell transplant.

In some embodiments, the subject has a non-seminoma cancer. In all instances where non-seminoma identified, the male subject is treated with orchiectomy or a radical inguinal orchiectomy is performed in which one or both testes and the spermatic cord is surgically removed. Depending on the stage of the non-seminoma, additional treatments are administered to the male subject.

In one example, for Stage IA (T1) non-seminomas, the male subject may be treated with retroperitoneal lymph node dissection (RPLND). Having the lymph nodes at the back of the abdomen removed has the advantage of a high cure rate, but the disadvantages of major surgery with its possible complications, including losing the ability to ejaculate normally. After RPLND, if cancer is found in the nodes, chemotherapy may be recommended. In some instances, the male subject may be treated with chemotherapy, such as one cycle of the BEP, instead of or in addition to surgery.

In another example, for Stage IB (T2, T3, T4) non-seminomas, the male subject can be treated with RPLND. If cancer is found in the lymph nodes, chemotherapy is often recommended depending on the number of nodes with cancer in them. In some instances, the male subject can be treated with chemotherapy, such as one cycle of BEP, in addition to surgery. If cancer is found in the lymph nodes after surgery, the male subject can be treated with chemotherapy such as two to four cycles of BEP or EP.

In another example, for Stage IS non-seminomas, the male subject can be treated with chemotherapy such as three cycles of BEP or four cycles of EP, if the subject's tumor marker levels (e.g., alpha-fetoprotein (AFP) or HCG) are still high even after the cancer has been removed but a tumor is not detectable by CT scan.

In another example, for Stage IIA non-seminomas, the male subject can be treated with RPLND or chemotherapy or both. In some instances, if tumor markers are higher than normal, the male subject can be treated with chemotherapy such as four cycles of EP or three cycles of BEP. If the lymph nodes that were removed contain cancer but tumor levels are normal, the male subject can be treated with chemotherapy, such as two cycles of EP or BEP. If no cancer is detected in the nodes and tumor levels are normal, the male subject can be monitored for signs that the cancer recurred. If cancer was found in many lymph nodes, the male subject can be treated with chemotherapy such as four cycles of EP or three cycles of BEP. In some instances, the male subject may be treated surgically to remove all enlarged nodes if tumor marker levels are normal.

In another example, for Stage IIB non-seminomas, the male subject can be treated with RPLND or chemotherapy or both. In some instances, if tumor markers are higher than normal, the male subject can be treated with chemotherapy such as four cycles of EP or three cycles of BEP. In some instances, if tumor marker levels are normal, the subject can be treated with four cycles of EP or three cycles of BEP. The male subject can additionally be treated surgically to remove all enlarged nodes if tumor marker levels are normal. In some instances, where the cancer has spread only to certain lymph nodes, the subject can be treated with RPLND to remove those lymph nodes. In some instances, the male subject can still be treated after RPLND with chemotherapy as noted above.

In another example, for Stage III non-seminomas, the male subject can be treated with chemotherapy such as four cycles of EP or three or four cycles of BEP. In some instances, if the subject has an intermediate or poor risk non-seminoma, treatment can be four cycles of BEP. This can depend on the spread to distant areas and tumor marker levels. In some instances, if there are medical reasons that make treatment with bleomycin unsafe, the male subject can be treated with vinblastine, ifosfamide, and cisplatin (VIP) instead. In some instances, if the male subject has very high levels of the tumor marker human chorionic gonadotropin (HCG), distant spread of cancer is seen on scans, and there is a high suspicion that the male subject might have a testicular choriocarcinoma, treatment of the male subject with chemotherapy may be started without a biopsy or surgery to remove the testicle. In some instances, if the cancer has spread to the brain, the male subject can be treated with surgery (for example, if there are only one or two tumors in the brain), radiation therapy aimed at the brain, or both. If the tumors in the brain are not bleeding or causing symptoms, treatment of the male subject with chemotherapy may be started first in some instances. Once chemotherapy is complete, the male subject should be evaluated for the presence of tumors and tumor markers. If the male subject has normal scans and normal tumor marker levels, the male subject can be monitored as discussed below and may not need further treatment. If additional tumors remain after chemotherapy, such as in the lung or in the retroperitoneal lymph nodes, the male subject can be treated with surgery to remove the tumors. If the cancer is found in the removed tumors, the male subject can be treated with additional chemotherapy, such as using a different combination of drugs. In some instances, where the cancer is resistant to chemotherapy or has spread to many organs, the male subject can be treated with a high-dose chemotherapy regimen followed by a stem cell transplant.

In some instances, the male subject has recurrent testicular cancer (has been previously been treated for testicular cancer). Treatment of recurrent germ cell tumors depends on the initial treatment and where the cancer recurs. Cancer that comes back in the retroperitoneal lymph nodes can be treated by RPLND if the recurrence is small and if the only surgical treatment given before was orchiectomy. Depending on the results of the surgery, chemotherapy may be recommended as well. In some instances, if it looks as if cancer has recurred in a lot of the retroperitoneal lymph nodes or if the cancer has returned elsewhere, the male subject can be treated with chemotherapy. This may be followed by surgery. In some instances, if the cancer recurs after chemotherapy or if treatment is no longer working, the male subject can be treated with different chemotherapy, which can include ifosfamide, cisplatin, and either etoposide, paclitaxel, or vinblastine. In some instances, the male subject is treated with high dose chemotherapy.

In some instances, treatment of the male subject includes reducing the amount of KLHL11 autoantibodies in the subject. For example, the amount of KLHL11 autoantibodies may be reduced by plasmapheresis, which involves the removal of blood from the subject, separation of the plasma from blood cells, and reinjection of the cells. In particular embodiments, plasmapheresis may be carried out by plasma exchange, in which the plasma removed is replaced in whole or in part by a plasma substitute such as lactated Ringer's solution, or by plasma perfusion, in which the autoantibodies are separated from the plasma and the plasma then returned to the subject.

Autoantibodies may be removed from the subject's plasma by any suitable technique, such as by contacting the plasma to a solid support having an immunoglobulin binding protein (e.g., protein A) immobilized thereon), removing the plasma from the solid support, and then returning the plasma to the subject. Typically, this method is practiced by immobilizing the immunoglobulin binding protein on an affinity support in an affinity column, passing the blood plasma through the affinity column, and returning the plasma to the subject (optionally, but preferably, recombining the plasma with the patient's blood cells). The method may also be carried out on whole blood or other suitable blood fraction, which may then be recombined with blood cells and then returned to the patient, as will be appreciated by persons skilled in the art.

In a variation of the foregoing, the KLHL11 protein or one or more antigenic fragments thereof may be immobilized on the solid support, and the KLHL11 autoantibodies selectively removed from the subject's blood by contacting the subject's blood, blood plasma, or other suitable fraction to the solid support, as described above. Such procedures advantageously avoid substantial reduction in levels of other antibodies in the subject undergoing treatment.

In many instances, following treatment, the male subject is monitored at regular intervals over time (such as annually or every two to five years) for indications of cancer recurrence (such as elevated tumor markers or presence of tumors).

In some instances, the male subject is monitored during the course of or after treatment using the provided methods. For example, the provided methods can be used to investigate neurological symptoms that appear in the course of, or after, cancer therapy, and are not explainable by metastasis. A male subject exhibiting such neurological symptoms may be assessed using the provided methods to determine if testicular cancer or a premalignant condition is present as indicated by detection of the KLHL11 polypeptide in a biological sample from the subject. In some instances, the provided methods can be used to differentiate autoimmune neuropathies from neurotoxic effects of chemotherapy. For example, if a male subject is being treated with chemotherapy and is exhibiting neurological symptoms, the provided methods may be used to assess if the symptoms are due to the effects of the chemotherapy or if a testicular cancer or a premalignant condition is present as indicated by detection of the KLHL11 polypeptide in a biological sample from the subject. If a seminoma is present, the male subject may receive additional treatment for the testicular cancer or a premalignant condition. If a testicular cancer or a premalignant condition is not present, the chemotherapy treatment administered to the male subject may be altered or replaced with a different therapy to address the neurological symptoms. In some instances, the provided methods can be used to monitor the immune response of male subjects that have been determined to have elevated KLHL11 polypeptide levels in the course of cancer therapy. For example, if therapy is successful in treating the subject's testicular cancer or premalignant condition, the provided methods should reflect a reduction or elimination of detectable KLHL11 polypeptide in a biological sample from the subject. If KLHL11 polypeptide remains detectable in a biological sample during or after cancer therapy, the subject may still have a testicular cancer or premalignant condition and additional treatment can be necessary. In some instances, the provided methods can be used to detect early evidence of cancer recurrence in male subjects that have been determined to have elevated KLHL11 polypeptide levels. Following successful treatment, the provided methods can be used during continued monitoring of the male subject at regular intervals over time to assess KLHL11 polypeptide levels. In some instances, if KLHL11 polypeptide is detected using the provided methods, the male subject can have recurrence of a testicular cancer or premalignant condition.

In another aspect, provided are methods of imaging KLHL11 polypeptide-expressing cells in a subject. The method comprises administering to the subject an effective amount of an anti-KLHL11 antibody having specific binding affinity for a KLHL11 polypeptide that is labeled with an imaging agent under conditions in which the anti-KLHL11 antibody binds to a KLHL11 polypeptide released from, or accessible in, cells, and detecting any complex so formed. Anti-KLHL11 antibodies can be labeled either directly or indirectly, and a wide variety of labels, including radioactive labels (radioisotopes), enzymes, substrates, cofactors, inhibitors, fluorescers, chemiluminescers, magnetic particles, and imaging agents. Exemplary imaging agents include radioactive labels and fluorescent labels (chemical moiety or heterologous polypeptide) as described above and heavy metal labels (such as, for example, $^{111}$In, $^{97}$Ru, $^{67}$Ga, $^{68}$Ga, $^{72}$As, $^{89}$Zr and $^{201}$Tl). Techniques for conjugation of imaging agents and other labels are known and are reported extensively in both the scientific and patent literature. As is well known to those of ordinary skill in the art, a suitable amount of an anti-KLHL11 antibody is any amount that is effective to image cells, for example, with regards to a radioactive label, about 0.1 mCi to about 50.0 mCi. In addition, an effective amount of an anti-KLHL11 antibody may be an amount from about 0.01 mg to about 100 mg. Suitable methods of administering the imaging agent are as described above and can be targeted (e.g., to the brain) as described above. Methods of imaging are dependent upon the agent used and are well known to those of skill in this art.

In accordance with the present disclosure, there may be employed conventional molecular biology, microbiology, biochemical, and recombinant DNA techniques within the skill of the art. Such techniques are explained fully in the literature. The provided methods and compositions will be further described in the following examples, which do not limit the scope of the methods and compositions of matter described in the claims.

EXAMPLES

Example 1. Phage Display Library Preparation and Performance Validation

A programmable phage display based on the Phage Immunoprecipitation and Sequencing (PhIP-Seq) technique described by Larman, H. B., et al., Nat. Biotechnol. 29:535-541 (2011) was used to identify candidate autoantigens. The published PhIP-Seq technique was expanded upon by designing a larger, more comprehensive T7 bacteriophage library of endogenous human peptides than has been previously published. The phage display utilized a custom human proteome library of 731,724 unique phage clones and includes all known and predicted human protein splice variants in the National Center for Biotechnology Information (NCBI) Protein database. The displayed peptides are 49 amino acids in length with a 25 amino acid overlap covering all protein coding regions of the human genome, including all protein isoforms. This custom library is referred to as the Human PhIP-Seq Library v2.

The Human PhIP-Seq Library v2 contains all annotated human protein sequences from the NCBI protein database as of November 2015; including all published and computationally predicted splice variants and coding regions. Full-length sequences were clustered on 99% sequence identity using CD-HIT v4.6 (Li, W. and Godzik, A. Bioinformatics 22(12):1658-59 (2006)) to remove duplicate and partial sequences, resulting in a set of 50,276 proteins. Each protein was computationally divided into 49 amino acid peptides using a 24 amino acid residue sliding window approach such that sequential peptides overlapped by 25 amino acid residues. Peptides encoding the final 49-residues at the c-terminus were substituted when the final sliding window resulted in shortened or truncated sequences (proteins not evenly divisible by 49). This resulted in a set of 1,256,684 peptide sequences encompassing the entire human proteome. To remove redundant sequences derived from identical regions of the various isoforms and homologs, the 49 amino acid peptides were further clustered and collapsed on 95% identity such that peptides with two or fewer amino acid differences were combined by choosing one representative sequence.

Amino acid sequences were converted to nucleotides using preferred E. coli codons as described in Maloy, S., et al, 1996. Genetic analysis of pathogenic bacteria. Cold Spring Harbor Laboratory Press, NY. (Supplement). Restriction sites (EcoRI, HindIII, BamHI, XhoI) were removed with synonymous nucleotide changes to avoid complications during cloning. To enable amplification from synthesized oligo pools, 21 nucleotide (nt) universal priming sites were added to the 5' and 3' ends of each oligo. These priming sites also encoded STREP and FLAG tag sequences (after addition of a terminal codons by PCR) that allow for downstream assessment of proper, in frame cloning. The final library consisted of 731,724 unique 189mer oligonucleotide sequences encoding 49 amino acid human peptides flanked by 5'-STREP and 3'-FLAG sequences after amplification with appropriate primers. The final library was synthesized by Agilent, Inc. in three separate pools. The complete sequence of each oligo is available on the GitHub platform as the "PhIP-PND-2018" repository uploaded by user "derisilab-ucsf" (available at github.com/derisilab-ucsf/PhIP-PND-2018).

After size selection (Blue Pippin 3% Agarose cassette, Sage Science, Beverly, MA) but prior to cloning and packaging into phage, the synthesized oligonucleotides were evaluated by Next-Generation Sequencing (NGS) with 70 million paired-end 125 nt reads. 98.5% of all the synthesized oligonucleotides were full length, and 84% were error free. For those with errors, a majority (10% of all sequences) were deletions of 3 or fewer bases, single base substitutions accounted for 4%, and the remaining 2% of sequences contained larger deletions (>4 bases) or truncated/chimeric sequences. The commercially synthesized library yielded 722,436 unique peptide sequences with an estimated Chao1 diversity of 723,421, indicating that 99% of the library was present. The distribution and coverage of the library was uniform, with 99.9% of the sequences within one log (10×) of the expected fraction.

ssDNA oligonucleotides were commercially synthesized in three separate pools (Agilent), and then were amplified by PCR primers adding relevant EcoRI and HindIII restriction. To minimize the proportion of truncations and deletion errors most commonly associated with commercial synthesis chemistries, digested fragments were size selected by agarose gel electrophoresis (Blue pippin 3% cassette (BDQ3010)) before ligation/cloning. Size-selected and restriction-digested oligonucleotides were cloned and packaged into T7 bacteriophage in 25 separate 10 μl reactions according to the manufacturer's specifications (EMD/Novagen, Burlington MA). BLT5403 E. coli cultures were grown to log phase (OD600=0.5) were inoculated (0.001 MOT) with packaging reaction and allowed to clarify (complete lysis) by incubating in 37 degree incubator (2-3 hours). BLT5403 carries an ampicillin-resistant plasmid expressing a wildtype gene 10A behind a T7 promoter. Phage produced in this strain carry 5-15 copies of the 10B capsid protein bearing the cloned fusion peptide. Lysates were cleared of debris by centrifugation at 4,000 rcf at 4 degrees for 30 min before filtering through a 0.22 micron filter. Phage were precipitated by adding ⅕ volume 5×PEG/NaCl precipitation buffer (PEG-8000 20%, NaCl 2.5 M) and centrifuged at 13,000 g for 60 min. Pellets were raised in ¼ starting volume storage buffer (20 mM Tris-HCl, pH 7.5, 100 mM NaCl, 6 mM MgCl2—cite phage on TAP). Stocks were titered by plaque assay (T7 manual) and diluted/concentrated to ~10^11 pfu/ml.

The efficiency of in vitro packaging was quantified by plaque assay. The diluted and quenched packaging reaction (3 ml total) contained $10^9$ plaque forming units (pfu)/ml, roughly 1000× coverage of the entire library. This library of phage clones (70 million paired-end 125 nt reads) was sequenced to determine the fidelity of the packaged library. 77% of phage sequenced yielded error-free, full-sized inserts. The majority of errors (21% of all sequences) were deletions or stop codons resulting in shorter expressed peptides. Within the 77% of correct sequences, there were 657,948 unique clones with an estimated Chao1 diversity of 658,476, indicating that 89% of this library was packaged and cloned without any errors. Allowing for synonymous mutations and single amino acid substitutions, 92% of the library was packaged successfully into phage.

In order to identify phage significantly enriched after multiple (i.e. 3) rounds of selection with patient antibodies, a statistical framework was developed based on phage fold-change statistics relative to a collection of 40 independent mock immunoprecipitations (IPs) using protein-AG beads alone. 96-well, full skirted, low profile PCR plates (BioRad) were incubated overnight with 180 μl IP blocking buffer (3% BSA, PBS-T) to prevent nonspecific binding. Blocking buffer was replaced with 150 μl of phage library (10 pfu in storage buffer) and mixed with 2 μl patient CSF, patient sera diluted 1:100 in blocking buffer, or 2 ng commercial antibody and incubated overnight at 4 degrees Celsius. Protein A and G magnetic beads (Dynabeads, Invitrogen) were mixed equally, washed 3× and resuspended equivalent volumes of TNP-40 buffer. The IP protocol was carried out on Biomek FX robotics platform (Beckman Coulter). 10 μl of A/G bead slurry was added to each IP reaction (wide bore pipettes) and incubated for 1 hour at 4 degrees. Beads were washed by magnetic separation, removal of supernatant and resuspension in 150 μl wash buffer. Subsequent to final wash, beads are resuspended in 150 μl LB and used to inoculate fresh E. coli cultures (400 ul at OD600=0.5) for in vivo amplification. Lysates were spun at 3,000 g (4 degrees Celsius) and 150 μl removed/stored for NGS library prep or additional rounds of IP. Sequencing libraries were prepared from lysates with a single PCR reaction using multiplexing (MP) primers. Libraries were purified and size selected by Ampure XP magnetic beads, eluted in 20 ul of nuclease-free water and quantified by Qubit (Thermo Fisher, Waltham MA) dsDNA high sensitivity fluorimeter. Sequencing was performed on either an Illumina HiSeq 2500 or 4000 using custom indexing and sequencing primers.

Reads were quality filtered (PRICESeq Filter), paired end reconciled (PEAR), and aligned to a reference database of the full library (bowtie2—2.3.1). Sam files were parsed using a suite of in-house analysis tools (python/pandas), and individual phage counts from each control and sample immunoprecipitate were normalized to reads per 100,000 (rpK) by dividing by the sum of counts and multiplying by 100,000. Normalized peptide counts from each experimental IP were multiplied by a sample-specific scaling factor derived from the median rpK of the 100 most highly and consistently enriched AG-bead binding peptides (data not shown). This set of the 100 most abundant peptides in the control IPs have a standard deviation less than their mean. This "internal control" set represented the most abundant and consistent phage carried along specifically by the protein-AG beads or other reagents, in absence of any antibody. The sample-specific scaling factor, defined as the ratio of median abundances (rpK) of these 100 peptides in the controls to their abundance in the given sample. Fold change values are the multiplied by their sample-specific scaling factor. Each peptide's fold-change enrichment was then calculated by dividing its scaled rpK value by its mean representation (expected abundance) in the A/G control IP. For peptides never observed in any control IP, fold changes are calculated using the median rpK for all peptides derived from that gene in the mock IP.

Given the nature of the fold-change calculation, small fluctuations in low abundance phage in control IPs can lead to inflated fold-change values and false positives. To address this, fold-change values were further transformed using a method inspired by smoothed quantile normalization approaches in microarray data described by Du, P. et al., Bioinformatics 24(13):1547-48 (2008). P-values were assigned to the fold-changes by evaluating the survival function of a normal distribution fit to the $\log_{10}$(fold-change) values in each experimental batch. Fold-change values were normalized (within each experimental batch) using a correction factor defined as the solution to a linear regression fit to the fold change values as a function of $\log_2$(rpK in A/G controls). Importantly, fold-change values were only corrected when the correction factor is positive (expected fold-change given the abundance in mock IPs is positive). Similar to quantile normalization, this ensures that the mean fold-change for all peptides is centered at 0. A normal distribution was fit to the FC values and assign p values by evaluating the survival function (1-CDF) at a given fold-change. Peptides reported as significant were those with a positive fold-change having an adjusted p-value ($p_{adj}$)≤0.05 in two replicates after multiple test correction as described by Benjamini, Y. and Hochberg, Y., JSTOR 57(1):289-300 (1995) (an adjusted p value ($p_{adj}$) was calculated using the Benjamini Hotchberg procedure, enforcing a false discovery rate (FDR) of 0.05).

Validation of the PhIP-Seq protocol was performed using two commercial antibodies (anti-glial fibrillary acid protein (GFAP) (Agilent/DAKO) and anti-gephyrin (GPHN) (Abcam) polyclonal antibodies) with known specificities. Three rounds of enrichment were used to further select for the particular epitope and reduce the proportion of non-specific binders. After each round of enrichment, phage populations were assessed by sequencing to an average depth of 2 million paired-end 125 nt reads. After 3 rounds of enrichment, a majority (50-70%) of the phage in the final population encoded peptides derived from the commercial antibody target (data not shown). Replicate IPs were conducted on separate days and exhibited high reproducibility (r>0.8) in phage counts between experiments.

When applied to these data, this statistical model correctly identified peptides from the target gene of interest as the most significantly enriched with minimal off-target or unrelated peptides/genes (data not shown). The anti-GFAP IPs enriched 18 unique peptides representing more than 60% of all phage in the final library (in both replicates) and scaled fold-changes greater than 300,000× ($p_{adj}<10^{-20}$) over the mock IPs. Similarly, the anti-GPHN commercial antibody enriched four unique C-terminal gephyrin peptides with 10,000-fold enrichment ($p_{adj}<10^{-25}$) over control IPs.

Alignment of the significantly enriched peptides from the anti-GFAP IP to the full-length protein revealed a distinct antigenic profile (data not shown), suggesting the commercial antibodies had highest affinity for an approximately 27 amino acid region surrounding the exon 5-6 junction. Notably, this region was identified by the immune Epitope Database (IEDB) tools Emini Surface Exposure calculation (Emini, E. A. et al., J. Virology 55(3):836-839 (1985)) as having the highest B cell antigenicity potential. The three significantly enriched GPHN peptides were all overlapping sequences with consensus at the final 32 residues of the surface exposed C-terminus (data not shown). The anti-GPHN IPs also consistently enriched a single peptide from chromogranin A (CHGA) at levels greater than or commensurate with that of the GPHN peptides ($p_{adj}<10^{-30}$). Motif analysis using Gapped Local Alignment of Motifs (GLAM2) as described by Frith, M. C. et al., PLoS Comput. Biol. 4(4):e1000071 (2008) and alignment of the CHGA and GPHN phage-peptides, revealed a discontinuous 6-residue sequence shared between CHGA and GPHN (data not shown). Of the 256 peptides reported as significant in both replicates, 144 peptides (56%), contained the motif (data not shown). The probability of recovering these motif-containing peptides by chance given their representation in the original library is infinitesimal ($<10^{-300}$, Fischer's exact test), indicating that a majority of the peptides in the final phage population were, in fact, true binders to the commercial antibody. These data also demonstrated that single amino acid resolution binding motifs could be recovered given sufficient representation in the original library.

Example 2. Patient History and Clinical Characteristics

A 37 year-old man (patient 11) with a history of left testicular seminoma (tumor-node-metastasis stage T2N0M0) status post orchiectomy and single cycle of carboplatin in remission for 45 months presented with nine months of vertigo and truncal and appendicular ataxia and five months of diplopia. He was unable to drive, work or pick up his newborn twins. His neurologic exam was remarkable for horizontal and vertical nystagmus with a rotatory component, right upper extremity intention tremor and dysdiadochokinesia, dysmetria on finger-nose-finger testing on the right, and a wide-based, cautious gait with inability to tandem. Magnetic resonance imaging (MRI) of the brain showed a non-enhancing T2 hyperintense area around the fourth ventricle (FIG. 2). The CSF exam showed 32 leukocytes per cubic millimeter (97% lymphocytes and 3% monocytes), 11 red blood cells (RBCs) per cubic millimeter, a protein level of 59 mg per deciliter (normal range, 15-45 mg per deciliter), a glucose level of 56 mg per deciliter (3.1 mmol per liter; normal range, 40 to 85 mg per deciliter), and an CSF (IgG) index of 2.1 (normal range, <0.6). While it was initially suspected that he had suffered from a brainstem stroke, the discovery of inflammatory CSF prompted empiric antiviral treatment for viral encephalitis. After extensive diagnostic testing was negative including a negative paraneoplastic serological evaluation of CSF and serum and an unremarkable positron emission tomography/computed tomography scan of the whole body. He was treated presumptively for paraneoplastic encephalitis with glucocorticoids (intravenous methylprednisolone at a dose of 1 g daily for 5 days followed by tapering doses of oral prednisone) and intravenous immunoglobulin (IVIg) with resolution of his eye movement abnormalities, intention tremor and dysmetria and significant improvement in his truncal ataxia over a 6 week period. He stabilized on monthly IVIg for 3 months, but inadequate medical insurance resulted in transfer of care. He was re-evaluated and given a diagnosis of multiple sclerosis and clinically deteriorated (increased ataxia) over the next 8 months on glatiramer acetate. A repeat brain MRI showed an enlarged T2 hyperintense left inferior olive that did not enhance with the administration of gadolinium. Initially interpreted as a brainstem glioma, preparations were made to start chemotherapy and radiation before it was determined he likely had hypertrophic olivary degeneration. A repeat CSF exam was generally unremarkable (0 leukocytes per cubic millimeter, 1 RBC per cubic millimeter, a protein level of 35 mg per deciliter, a glucose level of 64 mg per deciliter (3.6 mmol per liter), an IgG index of 1.4) other than 14 CSF-exclusive oligoclonal bands (normal range, <2). The patient was restarted on high dose glucocorticoids followed by intravenous immunoglobulin (IVIg) treatment and then rituximab, again with more modest symptomatic improvement, most notably resolution of his severe positional vertigo.

Example 3. Patient Cohort Identification

A CSF sample from the patient was evaluated at the Mayo Clinic. Patient serum and CSF and commercial antibodies were tested on a cryosectioned (4 µm) composite of adult mouse tissues: cerebellum, midbrain, cerebral cortex, hippocampus, kidney and gut. Sections were fixed using 4% paraformaldehyde for 1 minute, then permeabilized with 3-[(3-cholamidopropyl) dimethylammonio]-1-propanesulfonate (CHAPS), 0.5%, in phosphate buffered saline (PBS, for 1 minute), and then blocked for 1 hour with normal goat serum (10% in PBS). After PBS-rinse, patient specimen was applied (serum was pre-absorbed with bovine liver powder, 1:240 dilution, and CSF was non-absorbed, 1:2 dilution). After 40 minutes, and PBS wash, a species-specific secondary antibody conjugated with fluorescein isothiocyanate (FITC, 1:100) or tetramethylrhodamine (TRITC, 1:100) was applied (Southern Biotechnology Associates, Inc, Birmingham, AL, USA). Cover slips were mounted using ProLong® Gold anti-fade medium (containing DAPI; Molecular Probes Thermo Fisher Scientific, USA). Fluorescence images were captured using Olympus BX51 polarizing microscope with Olympus DP73 high-performance Peltier-cooled, 17.28 megapixel camera. Patient specimens yielding positive results were titrated in doubling dilutions to determine the endpoint of autoantibody detection.

For dual staining of mouse tissue, patient serum (1:500) was applied along with commercial KLHL11 rabbit polyclonal IgGs (1:800; Catalog #PA5-62944, Thermo Fisher Scientific, USA). Secondary antibodies used were anti-human FITC-conjugated (1:200) and anti-rabbit Alexa Fluor 647-conjugated (1:200, Invitrogen, Thermo Fisher Scientific, Waltham, MA, USA). Confocal images were captured using a microscope (40× water immersion lens, LSM780; Carl Zeiss AG, Oberkochen, Germany).

It was recognized that the patient CSF sample belonged to a larger paraneoplastic disorder (PND) cohort unified by virtue of a shared immunofluorescent (IF) staining pattern. More specifically, the patient shared a unique staining pattern with 12 other male patients identified between 2001 and 2018 as shown in FIG. 1A and FIG. 1B, that was hypothesized to come from a common unclassified neural-specific antibody, referred to as the "Sparkles" antigen prior to its identification. The IF signal is sparse yet widespread throughout the brain, observed in several regions including hippocampus, cerebral cortex, cerebellum, midbrain, and brainstem, with apparent enrichment in perivascular tissue, perimeningeal tissue and white matter tracts. Similar staining patterns are seen in the corpus callosum, dentate gyrus, piriform cortex, medulla to pons, and medulla (data not shown). These cases were unified by a characteristic clinical profile and a strong association with seminoma.

Example 4. Autoantigen Identification and Confirmation

One milliliter of the Human PhIP-Seq Library v2 ($10^{10}$ plaque forming units) was incubated with patient cerebrospinal fluid (CSF) or serum samples. Patient antibodies were captured using protein A/G magnetic beads (Thermo Fisher, Dynabeads) and the beads washed. Antibody-bound phage were eluted and amplified in E. coli before a second round of immunoprecipitation (IP) followed by DNA extraction and next-generation amplicon single-end 50 nucleotide sequencing on an Illumina MiSeq instrument. For all samples, sequences were aligned to the reference human proteome library and peptide counts were normalized by converting raw read count to percentage of total reads per sample (data not shown). Peptide-level and gene-level enrichments were generated by dividing normalized counts from experimental samples by the mean of corresponding normalized counts from a cohort of non-inflammatory control sera (n=28). Patient CSF, patient sera, non-inflammatory CSF and non-inflammatory sera were run within the same experiment.

KLHL11 was identified as a novel autoantigen in seminoma associated encephalitis in the first patient (patient 11). In addition, the twelve additional patients presenting with encephalitis and identified serologically to have an unclassified IgG neural autoantibody evaluated in the Mayo Clinic Neuroimmunology Laboratory were also confirmed by phage display to be KLHL11 IgG seropositive (FIG. 4). The patients were all found to have seminoma or testicular pathology.

Epitope mapping was performed to assess what regions of KLHL11 protein may be epitopes recognized by patient autoantibodies. To epitope map, the sequencing data retrieved from individual IPs following the phage display described above. Following sequencing alignment to the human proteome library, the identifiable fragment ID's corresponding to KLHL11 were retrieved, in addition to their corresponding nucleotide sequences (147 nucleotides in length). These KLHL11 nucleotide sequences were translated into amino acid sequences (or peptide sequences, 49 amino acids in length) using standard rules of the genetic code. The list of all potential KLHL11 peptides present in the library are listed in Table 1, the specific KLHL11 peptides identified from anti-KLHL11 patient samples are highlighted in bold. CSF samples were assessed for patients 11, 3, 6, 5, 13, and 7; serum samples were assessed for patients 10, 5, and 9. Control samples included two anti-Ma2 encephalitis patient CSF samples, two health control samples (CSF and serum), and A/G bead alone. Samples were assessed for reactivity to 29 peptide fragments of KLHL11 and 15 peptide fragments of Ma2 protein antigen, PNMA2. As shown in FIG. 3, one KLHL11 fragment in particular (#10) was identified as an enriched common antigen in the cohort patients. Antigenicity was also observed for peptides 2 and 3 in patient 5 and for peptides 27 and 28 in patient 11 and to lesser extent for patients 5 and 7. Information about these antigenic peptides is provided in Table 1. The epitope shared by all patients with KLHL11 in this study maps to the BACK domain within KLHL11.

TABLE 1

KLHL11 polypeptide fragment antigens

| Peptide | Amino Acid Positions Relative to Full-Length KLHL11 | Amino Acid Sequence | SEQ ID NO |
|---|---|---|---|
| 0 | 1-49 | MAAAAVAAAAAAAAAASLQVLEMESMET AAAGSAGLAAEVRGSGTVDFG | 2 |
| 1 | 25-73 | SMETAAAGSAGLAAEVRGSGTVDFGPGPG ISAMEASGGDPGPEAEDFEC | 3 |
| 2 | 49-97 | GPGPGISAMEASGGDPGPEAEDFECSSH CSELSWRQNEQRRQGLECDIT | 4 |
| 3 | 73-121 | CSSHCSELSWRQNEQRRQGLFCDITLCF GGAGGREFRAHRSVLAAATEY | 5 |
| 4 | 97-145 | TLCFGGAGGREFRAHRSVLAAATEYFTPLL SGQFSESRSGRVEMRKWSS | 6 |
| 5 | 121-169 | YFTPLLSGQFSESRSGRVEMRKWSSEPGPE PDTVEAVIEYMYTGRIRVS | 7 |
| 6 | 145-193 | SEPGPEPDTVEAVIEYMYTGRIRVSTGSVH EVLELADRFLLIRLKEFCG | 8 |
| 7 | 169-217 | STGSVHEVLELADRFLLIRLKEFCGEFLKK KLHLSNCVAIHSLAHMYTL | 9 |
| 8 | 193-241 | GEFLKKKLHLSNCVAIHSLAHMYTLSQLAL KAADMIRRNFHKVIQDEEF | 10 |
| 9 | 217-265 | LSQLALKAADMIRRNFHKVIQDEEFTYTLPF HLIRDWLSDLEITVDSEEV | 11 |
| 10 | 241-289 | FYTLPFHLIRDWLSDLEITVDSEEVLFET VLKWVQRNAEERERYFEELF | 12 |

TABLE 1 -continued

KLHL11 polypeptide fragment antigens

| Peptide | Amino Acid Positions Relative to Full-Length KLHL11 | Amino Acid Sequence | SEQ ID NO |
|---|---|---|---|
| 11 | 265-313 | VLFETVLKWVQRNAEERERYFEELFKLLRL SQMKPTYLTRITIVKPERINA | 13 |
| 12 | 289-337 | FKLLRLSQMKPTYLTRHVKPERLVANNEV CVKLVADAVEIMALRAENIQ | 14 |
| 13 | 313-361 | ANNEVCVKLVADAVERTIALRAENIQSGTC QHPTSHVSLLPRYGNMDVI | 15 |
| 14 | 337-385 | QSGTCQEIPTSHVSLLPRYGQNMDVIMVIG GVSEGGDYLSECVGYFVDED | 16 |
| 15 | 361-409 | IMVIGGVSEGGDYLSECVGYFVDEDRWVN LPHIHNHLDGHAVAVTESYV | 17 |
| 16 | 385-433 | DRWVNLPHIHNHLDGHAVAVTESYVYVA GSMEPGFAKTVERYNPNLNTW | 18 |
| 17 | 409-457 | VYVAGSMEPGFAKTVERYNPNLNTWEHV CSLMTRKHSFGLTEVKGKLYS | 19 |
| 18 | 433-481 | WEHVCSLMTRKHSFGLTEVKGKLYSIGGH GNFSPGFKDVTVYNPELDKW | 20 |
| 19 | 457-505 | SIGGHGNFSPGFKDVTVYNPELDKWHNLE SAPKILRDVKALAIEDRFVY | 21 |
| 20 | 481-529 | WHNLESAPKILRDVKALAIEDRFVYIAART PVDRDTEDGLKAVITCYDT | 22 |
| 21 | 505-553 | YIAARTPVDRDTEDGLKAVITCYDTETRQ WQDVESLPLIDNYCFFQMSV | 23 |
| 22 | 529-577 | TETRQWQDVESLPLIDNYCFFQMSVVNSNF YQTASCCPKSYCLENEEAV | 24 |
| 23 | 553-601 | VVNSNFYQTASCCPKSYCLENEEAVRKIAS QVSDEILESLPPEVLSIEG | 25 |
| 24 | 577-625 | VRKIASQVSDEILESLPPEVLSIEGAAI-CYYK DDVFIIGGWKNSDDIDK | 26 |
| 25 | 601-649 | GAAICYYKDDVFIIGGWKNSDDIDKQYRK EAYRYCAERKRWMLLPPMPQ | 27 |
| 26 | 625-673 | KQYRKEAYRYCAERKRWMLLPPMPQPRC RATACHVRIPYRYLHGTQRYP | 28 |
| 27 | 649-697 | QPRCRATACHRIPYRYLHGTQRYPMP QNLMWQKDRIRQMQEIHRHALN | 29 |
| 28 | 660-708 | RIPYRYLHGTQRYPMPPQNLMWQKDRIR QMQEIHRHALNMRRVPSSQIEC | 30 |

Example 5. KLHL11 Autoantigen Confirmation

To validate the phage display findings, specific binding of patient antibodies to full-length, native KLHL11 protein was assessed. These orthogonal validations were performed in two ways, using 1) an in vitro human embryonic kidney 293T cell over-expression system and 2) rodent brain immunohistochemistry (IHC). For all validation experiments, patient CSF or serum was used as primary antibody and visualized using secondary antibodies to goat anti-human IgG (Alexa-568, Thermo Fisher, A-21090).

a. HEK 293T Cell-Overexpression Based Assays

Cell plating. HEK293T cells (ATCC-CRL3216) are plated at 30% density and grown at 37 degrees (5% $CO_2$/ 95% $O_2$) in complete DMEM media (Sigma) with Glutamine, 10% Fetal Bovine Serum (FBS), 50 µg/mL of Streptomycin and 50 I.U/ml of Penicillin. For immunocytochemistry (ICC) experiments, cells were plated on acid washed glass coverslips in 12-well standard tissue culture plates. For IPs and Western blotting (WB), the cells were plated on standard 10 $cm^2$ tissue culture dishes.

Transfection. Following plating, cells were allowed to seed for 24 hours and subsequently transfected with experimental plasmids using a standard calcium phosphate transfection method. For ICC experiments, 500 ng of a FLAG-tagged human KLHL1-expressing plasmid (Origene Cat: RC205228) or 500 ng of a GFP-expressing plasmid (Origene Cat: PSI00010) were transfected per each well of the 12 well plate. For IPs and WB experiments, one microgram of KLHL11 expressing plasmid was transfected per 10 cm$^2$ dish. Twenty-four hours following transfection, cells were harvested with respect to standard ICC or molecular protocols.

For all in vitro overexpression experiments, rabbit anti-Flag (Cell Signaling Technology, #14793S) or mouse anti-Flag (Sigma, F3165) were used to identify KLHL11. Primary commercial anti-Flag and anti-KLHL11 antibody binding was visualized using goat anti-rabbit-IgG secondary antibody (Alexa-488, Abcam, ab150081) unless otherwise noted.

ICC experiment. Twenty-four hours following transfection, cells were washed once in cold 1×PBS and fixed in 4% Paraformaldehyde for 15 minutes at room temperature. Following washing with 1×PBS, cells were permeabilized and blocked for one hour at room temperature in Blocking buffer (1×PBS, 10% Goat Serum, 0.1% Triton). Following blocking, cells were incubated in 1 mL of primary antibody buffer (1×PBS, 10% Goat Serum, 0.1% Triton) containing one of the following: Patient IgG (CSF 1:1000, Serum 1:10,000), commercial anti-KLH11 IgG (1 µg/mL) or commercial anti-FLAG IgG (1 µg/mL). Primary blocking buffer without antibody added was used as a secondary only control. Cells were incubated in primary antibody for 2 hours at room temperature or 4° C. overnight. Cells were washed 3× in PBST (1×PBS with 0.1% Triton-X) and incubated with secondary antibodies for 1 hour at room temperature, protected from light. To detect human antibodies, anti-Human IgG Alexa-568 was used. To detect rabbit or mouse commercial antibodies, anti-Rabbit IgG or Anti-Mouse IgG Alexa 488 was used. Following secondary antibody incubation, cells were washed 4× in PBST and mounted on a cover glass for microscopy. DAPI was added during mounting using standard DAPI Fluormount-G (Southern Biotech). ICC experiments were visualized using a Nikon Ti Spinning Disc confocal microscope, using the following excitation spectra: 405 nm (DAPI), 488 nm (GFP) 568 nm (RFP). Image capture settings, including exposure time, laser intensity, aperture, magnification was kept constant for all conditions in the experiment. Image TIFFs were analyzed in Image J and co-localization of RFP and GFP fluorescence was qualitatively determined. As shown in FIG. 7, positive co-localization of patient IgG and commercial KLHL11 antibody was observed in in the cell-based assay.

Commercial KLHL11 antibody was validated using the cell-based overexpression assay. 293T cells expressing KLHL11 were generated following the ICC protocol described above. Cells were stained with primary anti-KLHL11 (rabbit) and anti-FLAG (mouse) antibodies and visualized with secondary to Rabbit IgG (Alexa-568) or Mouse IgG (Alexa488), respectively. Controls were stained with secondary antibody only. Coverslips were imaged with a spinning disc confocal microscope at 100×. Colocalization of anti-FLAG and anti-KLHL11 signal was qualitatively assigned, using equal exposure methods for all conditions in the experiment. Co-labeling of Flag and KLHL11 signal was observed, as shown in FIG. 6.

IP and WB protocol. Twenty-four hours following transfection with KLHL1-FLAG plasmid, cells were washed once in cold 1×PBS and one mL of cold RIPA (50 mM Tris-HCL pH 7.5, 150 mM NaCL, 1.0% Triton-X, 0.1% SDS, Roche protease inhibitor tablet) was added. Cells were harvested with rubber policemen, lysates were aliquoted into Eppendorf tubes and allowed to lyse in RIPA for an additional 30 minutes at 4° C. with gentle agitation. Lysates were subsequently spun for 30 minutes at 16,000 g in a tabletop centrifuge at 4° C. Supernatants were then diluted to 1 mg/mL protein concentration using Tris-NP40 (50 mM Tris-HCL pH 7.5, 1.0% NP40, 150 mM NaCl) and used as lysates for immunoprecipitations. For each IP, 500 microliters of the 1 mg/mL 293T cell lysate was used and one of the following was added per condition: Patient IgG (CSF 1:500, Serum 1:1000), commercial anti-KLH11 antibody (1 ug/mL). A no antibody/protein A/G bead-only condition was used as a negative control. Antibodies were incubated with cell lysate overnight at 4° C. with gentle agitation. Antibodies were captured using protein A/G magnetic beads (Thermo Fisher, Dynabeads), and the beads were washed four times in cold RIPA. IPs were then eluted in 2× Laemmli buffer, boiled at 95° C. for 5 minutes. The denatured samples were electrophoresed on a 4-12% gradient SDS-PAGE gel (NuPAGE), and then transferred to 0.45 micron nitrocellulose for subsequent immunoblotting. To identify the presence of KLHL11-FLAG in the IPs from 293T cell lysates, a rabbit commercial antibody to anti-FLAG was used for primary antibody and visualized with anti-Rabbit IgG Secondary (LICOR IR800). As shown in FIG. 5, recombinantly expressed full-length human KLHL11 was successfully immunoprecipitated using patient CSF or serum.

b. IHC Analysis

Adult male C57B6 mice were perfused with 4% PFA, and the brains subsequently dissected and cryopreserved in 20% sucrose. Fixed brains were embedded in Optimal.Cutting, Temperature (OCT) compound, slowly frozen on dry ice and stored at −80° C. until needed. Fixed brains were sectioned on a cryostat at −20° C. in 12 micron sections onto Superfrost™ Plus microscope slides (Thermo Fisher Scientific). Sections were dried for 1 hour at room temperature and then stained with antibodies according to the ICC staining protocol described above. Commercial anti-KLHL11 antibody (Sigma, HPA054269) was used for immunofluorescence analysis. Microscopy was performed as described above for ICC experiments. Immunofluorescence analysis showed co-labeling of patient IgG and commercial KLHL11 antibody IgG on mouse brain tissue, as shown in FIG. 8 (piriform cortex staining shown). This finding supports the conclusion that the unique "Sparkles" IF staining pattern observed by the Mayo Clinic Neuroimmunology Laboratory in this cohort of patients is the result of this single common antigen.

Results of testing for KLHL11 antibodies in each patient by means of the above-described phage display, immunoprecipitation, cell-based assay, and mouse brain immunohistochemical analysis methods are listed in Table 2. The phage display system identified KLHL11 as a putative autoantigen in the index patient (Patient 11), and this was confirmed in samples obtained from 7 additional patients from the immunofluorescence archival series (FIG. 4). In this assay, antibodies from the cerebrospinal fluid or serum samples obtained from these patients, but not from healthy controls or patients with IgG autoantibodies to Ma2, showed specific enrichment of KLHL111 protein-derived peptides (FIG. 4). There was enrichment of a common peptide fragment within KLHL111 in the serum and cerebrospinal fluid of all the patients (FIG. 3).

TABLE 2

Summary of methods used to identify KLH11 autoantibodies in subjects

| Patient | Phage Display IP | Cell-Based Overexpression Assay with Co-Labeling | IP from Cell Lysate | Rodent Brain IHC |
|---|---|---|---|---|
| 1 | NT | +(serum) | NT | +(serum) |
| 2 | NT | +(serum) | NT | +(serum) |
| 3 | +(CSF) | +(CST) | +(CST) | +(CSF) |
| 4 | NT | +(serum) | NT | +(serum) |
| 5 | +(CSF, serum) | +(CSF, serum) | +(CSF, serum) | +(CSF) |
| 6 | +(CSF) | +(CSF, serum) | +(CSF) | +(CSF) |
| 7 | +(CSF) | +(CSF, serum) | +(CSF) | +(CSF) |
| 8 | NT | +(serum) | NT | +(CSF) |
| 9 | +(serum) | +(serum) | +(serum) | +(serum) |
| 10 | +(serum) | +(serum) | +(serum) | +(serum) |
| 11 (Index) | +(CSF) | +(CSF, serum) | +(CSF) | +(CSF) |
| 12 | NT | +(serum) | NT | +(serum) |
| 13 | +(CSF) | +(CSF, serum) | NT | +(CSF, serum) |

Example 6. Clinical Profile of Anti-KLHL11 Paraneoplastic Encephalitis

The cohort included thirteen male patients with autoimmune KLHL11 seminoma associated paraneoplastic encephalitis. All patient cases were evaluated by board-certified neurologists at Mayo Clinic or the University of California San Francisco (UCSF). Patients 11 and 13 were enrolled in a research study at UCSF (protocol number 13-12236) for pathogen and autoantibody detection for patients with idiopathic neuroinflammation. All other patients (patients 1-10 and 12) were enrolled at the Mayo Clinic and gave consent for the passive use of their medical records for research purposes (protocol numbers 08-007810, 08-007846). Electronic and paper medical records of the thirteen anti-KLHL11 encephalitis cases were reviewed for demographic details, clinical data, laboratory results, and outcome at last follow-up. A clinical summary of the patients is provided in Table 3. The "Sparkles" discovery refers identification of the characteristic immunofluorescence pattern seen on rodent brain slices with patient cerebrospinal fluid and a human immunoglobulin G fluorescent secondary antibody. Other acronyms used are: CSF: cerebrospinal fluid, WBC: white blood cell, OCB: oligoclonal band, USG: ultrasound, IVIg: intravenous immunoglobulin, IVMP: intravenous methylprednisolone, MMF: mycophenolate mofetil, CT: computed tomography, BEP: bleomycin, etoposide, and platinum, PET: positron emission tomography, PLEX: plasma exchange, USG: ultrasonography.

TABLE 3

Cohort Clinical Profile

| Patient | Date of "Sparkles" Discovery | Sex, Age at symptom onset (years) | Initial symptoms | Diagnostic tests | Initial Brain MRI Findings |
|---|---|---|---|---|---|
| 1 | 2001 | Male, 65 | Vertigo, diplopia, sensorineural hearing loss, ataxia | CSF WBC 10 cells/μl, CSF protein 40 mg/dl, 2 OCBs; Scrotal USG: right testicular mass | Mild cerebellar atrophy |
| 2 | 2004 | Male, 51 | Vertigo, diplopia, tinnutus sensorineural hearing loss, ataxia | CSF WBC 17 cells/μl, CSF protein 82 mg/dl, 14 OCBs; Scrotal USG: testicular mass | Mild cerebellar atrophy |
| 3 | 2005 | Male, 45 | Diplopia, ataxia, seizures | CSF WBC 49 cells/μl, CSF protein 93 mg/dl; Scrotal USG: atrophic testes, mictolithiasis | Bilateral mesial temporal T2 hyperintensities |
| 4 | 2007 | Male, 28 | Vertigo, diplopia, sensorineural hearing loss, ataxia | CSF WBC 35 cells/μl, CSF protein 86 mg/dl; CT abdomen: intra-pelvic mass | Unremarkable |
| 5 | 2010 | Male, 43 | Sensorineural hearing loss, vertigo, ataxia | CSF WBC 1 cell/μl, CSF protein 62 mg/dl, 6 OCBs; CT chest: anterior mediastinal mass | Mild cerebellar atrophy |

TABLE 3-continued

Cohort Clinical Profile

| | | | | | |
|---|---|---|---|---|---|
| 6 | 2011 | Male, 36 | Visuospatial disorientation, memory loss, suicidal ideation, sensorineural hearing loss, trigeminal neuropathy | CSF WBC 7 cells/µl, CSF protein 76 mg/dl, 9 OCBs; Scrotal USG: testicular mass | Bilateral hippocampal atrophy |
| 7 | 2014 | Male, 29 | Vertigo, diplopia, sensorineural hearing loss, ataxia | CSF WBC 8 cells/µl, CSF protein 69 mg/dl, 3 OCBs; CT chest: anterior mediastinal mass | Left parasagittal midbrain T2 hyperinensity |
| 8 | 2016 | Male, 42 | Dysarthria, ataxia | CSF WBC 3 cells/µl, CSF protein 70 mg/dl; Scotal USG: microlithiasis | Mild cerebellar atrophy |
| 9 | 2016 | Male, 68 | Vertigo. sensotineural hearing loss, ataxia | CSF WBC 1 cell/µl, CSF protein 43 mg/dl, 4 OCBs; CT abdomen: retroperitoneal mass | Mild cerebral and cerebellar atrophy |
| 10 | 2017 | Male, 41 | Dysarthria, ataxia, headaches | CSF WBC 71 cells/µl, CSF protein 85 mg/dl; Whole body PET-CT: hypermetabolic left peri-aoitic lymph nodes | Leptomeningeal enhancement |
| 11 | 2017 | Male, 37 | Veitigo, diplopia, ataxia | CSF WBC 32 cells/µl, CSF protein 59 mg/dl, 14 OCBs; Scrotal USG: left testicular mass | T2 hyperintensity surrounding the 4th ventricle including, cerebellar nuclei |
| 12 | 2018 | Male, 40 | Vertigo, dysarthria, ataxia | CSF WBC 9 cells/µl, CSF protein 50 mg/dl, 9 OCBs; Scrotal USG: right testicular mass | Unremarkable |
| 13 | 2018 | Male, 27 | Dysarthria, left upper extremity tremor, imbalance | CSF WBC 2 cells/µl, CSF protein 30 mg/dl, 10 OCBs; Scrotal USG: left testicular mass | Mild cerebellar atrophy |

| Patient | Symptom onset relative to tumor diagnosis (months) | Testicular Pathology | Treatment | Clinical course on treatment | Length of follow-up (months), Persistent neurological * deficits on last follow up |
|---|---|---|---|---|---|
| 1 | −23 | Stage IIIA testicular seminoma | Immunotherapy: IVIg, IVMP Tumor: right orchiectomy, radiation therapy | Stable | 95, Bilateral sensorineural hearing loss, ataxia, diplopia |
| 2 | −24 | Stage I testicular | Immunotherapy: IVMP, IVIg, | Stable | 84, Diplopia, cervical |

TABLE 3-continued

Cohort Clinical Profile

| | | | | | |
|---|---|---|---|---|---|
| | | seminoma | MMF<br>Tumor: radical<br>orchiectomy,<br>radiation therapy | | amyotrophy,<br>wide-based<br>gait<br>ambulating<br>with a cane |
| 3 | N/A | Testicular<br>fibrosis and<br>microlithiasis | Immunotherapy:<br>IVIg, IVMP,<br>MMF,<br>cyclophosphamide<br>Tumor: Right<br>radical inguinal<br>orchiectomy | Stable | 59,<br>Nystagmus,<br>ataxia |
| 4 | −4 | Stage IIIA<br>testicular<br>seminoma | Immunotherapy:<br>IVMP, IVIg,<br>cyclophosphamide<br>Tumor: resection<br>of intrapelvic<br>testicular mass,<br>radiation therapy | Stable | 60, Ataxia,<br>wheelchair-<br>dependent |
| 5 | −23 | Extra-<br>testicular<br>seminoma<br>(primary<br>mediastinal<br>extragonadal<br>germ-cell<br>tumor) | Immunotherapy:<br>IVMP,<br>cyclophosphamide<br>Tumor: surgical<br>resection of<br>mediastinal mass | Improved | 98, Right-<br>sided<br>sensorineural<br>hearing loss,<br>intermittent<br>diplopia |
| 6 | −158 | Stage IIA<br>testicular<br>seminoma | Immunotherapy:<br>IVMP<br>Tumor: left.<br>radical<br>orchiectomy,<br>radiation therapy | Stable | 216,<br>Dementia,<br>sensorineural.<br>hearing loss,<br>trigeminal<br>neuropathy |
| 7 | −3 | Stage IIIA<br>extra-testicular<br>seminoma | Immunotherapy:<br>IVIg, WNW,<br>rituximab,<br>cyclophosphamide<br>Tumor: surgical<br>resection, radiation<br>therapy,<br>chemotherapy (3<br>cycles of BEP) | Progressive<br>decline | 60, Diplopia,<br>dysarthrta,<br>ataxia,<br>paraplegia |
| 8 | N/A | Testicular<br>fibrosis and<br>microlithiasis | Immunotherapy:<br>IVMP, IVIg,<br>rituximab,<br>cyclophosphamide,<br>natalizumab<br>Tumor: left<br>radical<br>otchiectomy | Progressive<br>decline | 26,<br>Dysarthria,<br>ataxia,<br>ambulates<br>with a walker |
| 9 | +8 | Stage IIIB<br>testicular<br>seminoma | Immunotherapy:<br>IVMP,<br>cyclophosphamide<br>Tumor: radical<br>orchiectomy,<br>lymph node<br>dissection,<br>chemotherapy<br>(etoposide,<br>cisplatin) | Progressive<br>decline | 8, Nystagnms,<br>dysarthria,<br>ataxia ,<br>wheelchair-<br>dependent |
| 10 | −6 | Stage IIA<br>extra-testicular<br>seminoma | Immunotherapy:<br>IVMP, PLEX,<br>prednisone,<br>rituximab,<br>cyclophosphamide<br>Tumor:<br>chemotherapy (3<br>cycles of BEP) | Stable | 14,<br>Dysarthria,<br>tinnitus,<br>ataxia,<br>wheelchair-<br>dependent |
| 11 | +42 | Stage I<br>testicular<br>seminoma | Immunotherapy:<br>IVMP, IVIg,<br>rituximab<br>Tumor: tell<br>orchiectomy,<br>single cycle<br>carboplatin | Progressive<br>decline | 43,<br>Nystagmus,<br>dysarthria,<br>diplopia,<br>ataxia,<br>ambulates<br>with a waller |
| 12 | −3 | Stage IIA<br>testicular<br>seminoma | Immunotherapy:<br>IVMP, IVIg,<br>PLEX, prednisone, | Stable | 10, Spasticity<br>ataxia,<br>ambulates |

TABLE 3-continued

Cohort Clinical Profile

| | | | | | |
|---|---|---|---|---|---|
| 13 | −21 | Stage I testicular seminoma | cyclophosphamide Tumor: Right radical inguinal orchiectomy, chemotherapy (carboplatin) Immunotherapy: IVMP, prednisone, IVIg Tumor: Right radical orchiectonty | Stable | with a cane 2, Dysarthria, ataxia, visual fixation difficulties |

The median age at symptom onset was 41 years (range: 27-68 years). The median KLHL11 IgG antibody titers in serum and CSF were 1:15,360 (range, 1:960-1:244,800; normal range, ≤1:120) and >1:712 (normal range, <1:2), respectively. Most patients presented with rhombencephalitis (11/13) with ataxia (12/13) as the most common initial symptom. One patient presented with cognitive decline, mood disorder, sensorineural hearing loss and trigeminal neuralgia. Other neurologic symptoms included vertigo (8/13), sensorineural hearing loss (7/13), diplopia (6/13) and dysarthria (4/13). CSF analysis revealed inflammatory changes in all patients, such as elevated total protein, pleocytosis, supernumerary oligoclonal bands, and/or elevated IgG index. Median CSF protein and leukocyte count were 69 mg per deciliter (range: 30-93 mg per deciliter) and 9 leukocytes per cubic millimeter (range: 1-71 cells per cubic millimeter, lymphocyte predominant), respectively. Supernumerary oligoclonal bands were detected in 89% (7/9) of the cases tested (median 9, range 2-14), and the IgG index was elevated in 50% (4/8) of the cases tested. No patient has had a tumor recurrence detected.

Testicular (n=8) or extra-testicular (n=3) seminoma was identified in 11 patients. In eight of these patients, the paraneoplastic neurological syndrome led to the diagnosis of the underlying tumor. Two patients without seminoma had testicular microlithiasis and fibrosis, putative pre-malignant conditions (see Derogee, M. et al. Urology 57:1133-1137 (2001); Wang, T. et al. Urol J. 12:2057-2064 (2015); Dhankar, S. S. et al. J. Postgrad. Med. 31:115-117 (1985). The median interval between neurologic symptom onset and tumor diagnosis was 6 months (range: −42 to 158 months).

In sum, a majority of the cases presented with a characteristic oencephalitis clinical syndrome of vertigo, tinnitus, hearing loss, and ataxia. More than 80% of the cases (1/13) were diagnosed with seminoma, and the two cases without a detectable seminoma had testicular microlithiasis.

All patients described in Table 3 share a unique IF pattern identified by the Mayo Clinic Neuroimmunology Laboratory during the period of 2001-2018, which is referred to herein as the "Sparkles" pattern. Specificity of the IF phenotype was assessed qualitatively through comparison of IF staining pattern yielded by IgG in serum from (1) 317 healthy subjects, (2) 69 patients with cancer but no neurologic disease (including 6 seminomas), (3) 147 patients with other neurologic diseases (anti-Ma2 brainstem encephalitis (n=8), Purkinje cell cytoplasmic antibody type 1 IgG associated cerebellar ataxia (n=6), anti-neuronal nuclear autoantibody type 2 IgG associated brain-stem encephalitis (n=28), chronic lymphocytic inflammation with pontine perivascular enhancement responsive to steroids (CLIPPERS, n=17), multiple sclerosis (n=38), Sjögren syndrome (n=15), and CNS systemic lupus erythematous (n=35)) and (4) in CSF samples from 77 patients (normal pressure hydrocephalus (n=13); multiple sclerosis (n=42); acute disseminated encephalomyelitis (n=12); CLIPPERS (n=5) and chronic inflammatory demyelinating polyneuropathy (n=5)).

The specificity of the IgG immunostaining pattern in Index Patient 11 and the additional patients described was assessed qualitatively through comparison of the pattern yielded by IgG from 317 serum samples obtained from healthy controls, patients with cancer but no neurologic disease (69, including 6 with seminomas), and patients with other neurologic diseases (Ma2 brainstem encephalitis, PCA1 IgG (a.k.a. anti-Yo) associated cerebellar ataxia, ANNA2 IgG (a.k.a. anti-Ri) associated brain-stem encephalitis, CLIPPERS, multiple sclerosis, Sjogren syndrome, CNS systemic lupus erythematous), including paraneoplastic rhombencephalitis (in 42 patients). Of these 42 patients, 28 had anti-neuronal nuclear antibody type 2 (ANNA-2, or anti-Ri) IgG-associated brainstem encephalitis, 8 had Ma2 brain-stem encephalitis, and 6 had Purkinje cytoplasmic antibody type 1 (PCA-1, or anti-Yo)-associated paraneoplastic cerebellar degeneration (data not shown).

Example 7. Treatment

Patient treatment and response is indicated in Table 3. Orchiectomy was performed in ten patients including the two patients with microlithiasis. Radiation therapy (5/11) and chemotherapy (5/11) were also utilized for management of seminoma. All patients received immunotherapy to treat their neurological syndrome. One patient had sustained clinical improvement with the ability to walk independently, resolution of diplopia, and return to work. Eight patients had stabilization of the neurologic syndrome. However, four patients had worsening of the neurologic syndrome after management of the underlying cancer (n=3) or orchiectomy (surgical removal) of the microlithiasis (n=1) and immunotherapy.

Example 8. Population-Based Epidemiologic Study

The overall age- and sex-adjusted prevalence of paraneoplastic autoimmune KLHL11 encephalitis in Olmsted County, Minnesota, USA was measured on the basis of the Rochester Epidemiology Project database from the Mayo Clinic, which contains the medical records of more than 95% of persons who lived in Olmsted County from Jan. 1, 1966 to Jan. 1, 2014. Prevalence rates were calculated as the number of anti-KLHL11 encephalitis patients by the population count as of Jan. 1, 2014, and were reported per 100,000 person-years. As of Jan. 1, 2014, the prevalence was 1.4 per 100,000 person-years (95% confidence interval (CI), 0 to 3.3 per 100,000). The age-adjusted prevalence among males was 2.79 per 100,000 person-years (95% CI, 0 to 6.65 per 100,000). The incidence rate among males between Jan. 1, 1995 and Dec. 31, 2015 was 0.21 per 100,000 person-years (95% CI, 0 to 6.65 per 100,000). The prevalence of KLHL11 IgG (1.4/100,000) was considerably higher than the other paraneoplastic antibodies associated with autoimmune encephalitis (e.g., ANNA2 IgG, 0.6 per 100,000; and collapsin response mediator protein 5 IgG, 0.7 per 100,000; see Dubey, D., et al., Ann Neurol. 83:166-77 (2018)). Thus, KLHL11 IgG is one of the more common autoimmune encephalitis biomarkers.

All patents, patent publications, patent applications, journal articles, books, technical references, and the like discussed in the instant disclosure are incorporated herein by reference in their entirety for all purposes.

It is to be understood that the figures and descriptions of the disclosure have been simplified to illustrate elements that are relevant for a clear understanding of the disclosure. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

In the foregoing description, numerous specific details are set forth to provide a more thorough understanding of the present invention. However, it will be apparent to one of skill in the art that the invention described in this disclosure may be practiced without one or more of these specific details. In other instances, well-known features and procedures well known to those skilled in the art have not been described in order to avoid obscuring the invention. Embodiments of the disclosure have been described for illustrative and not restrictive purposes. Although the present invention is described primarily with reference to specific embodiments, it is also envisioned that other embodiments will become apparent to those skilled in the art upon reading the present disclosure, and it is intended that such embodiments be contained within the present inventive methods. Accordingly, the present disclosure is not limited to the embodiments described above or depicted in the drawings, and various embodiments and modifications can be made without departing from the scope of the claims below.

What is claimed is:

1. A method of detecting the presence of a Kelch-like protein 11 (KLHL11) autoantibody in a biological sample from a male subject presenting with encephalitis, comprising the steps of:
   (a) contacting the biological sample with a KLHL11 polypeptide or antigenic fragment thereof, the polypeptide or fragment thereof having at least 95% identity to one or more sequences of SEQ ID NOs: 1-30; and
   (b) detecting the presence of binding of the KLHL11 polypeptide or antigenic fragment thereof to the KLHL11 autoantibody in the biological sample.

2. The method of claim 1, wherein the KLHL11 polypeptide or antigenic fragment is heterologously-expressed on the surface of a cell, a phage, or a virus.

3. The method of claim 1, wherein the KLHL11 polypeptide or antigenic fragment thereof is expressed in a phage display or eukaryotic cell display library.

4. The method of claim 1, wherein the KLHL11 polypeptide or antigenic fragment thereof is an isolated, purified KLHL11 polypeptide or fragment thereof.

5. The method of claim 1, wherein the KLHL11 polypeptide or antigenic fragment is an isolated, purified KLHL11 polypeptide or fragment thereof that is immobilized on a solid carrier.

6. The method of claim 1, wherein the KLHL11 polypeptide or antigenic fragment comprises the sequence of SEQ ID NO:1.

7. The method of claim 1, wherein the KLHL11 polypeptide or antigenic fragment thereof is in brain tissue or other nervous tissue.

8. The method of claim 1, wherein the biological sample is serum, plasma, cerebrospinal fluid, blood, or urine.

9. The method of claim 1, wherein the male subject has one or more of ataxia, cognitive decline, mood disorder, hearing loss, tinnitus, trigeminal neuralgia, vertigo, diplopia, dysarthria, or other neurological deficit.

10. The method of claim 1, wherein the male subject has one or more of ataxia, hearing loss, tinnitus, or vertigo.

11. The method of claim 1, wherein the male subject has at least one of:
   (i) a cerebrospinal fluid protein count of greater than 30 mg per deciliter;
   (ii) a cerebrospinal fluid blood cell count of at least 1 per cubic millimeter;
   (iii) two or more cerebrospinal oligoclonal bands; or
   (iv) a CSF index greater than 0.6.

12. The method of claim 1, wherein the male subject has at least one risk factor for testicular cancer.

13. The method of claim 1, wherein the male subject has not been previously diagnosed with testicular cancer.

14. The method of claim 1, wherein the male subject has been previously treated for testicular cancer or a premalignant condition or is being treated for testicular cancer or a premalignant condition.

15. The method of claim 1, wherein the presence of the binding of the KLHL11 polypeptide or antigenic fragment thereof to said KLHL11 autoantibody in the biological sample indicates that the subject has or is at risk of having testicular cancer or a premalignant testicular condition.

16. The method of claim 15, wherein the testicular cancer is seminoma.

17. The method of claim 1, wherein the presence of the binding of the KLHL11 polypeptide or antigenic fragment thereof to said KLHL11 autoantibody in the biological sample indicates that the subject has paraneoplastic encephalitis.

18. The method of claim 15, wherein the premalignant testicular condition is at least one of testicular microlithiasis, testicular atrophy, or testicular fibrosis.

19. The method of claim 1, wherein step (b) of detecting is performed by at least one of immunohistochemical staining, immunoprecipitation, microarray analysis, enzyme-linked immunosorbent assay (ELISA), or Western blot analysis.

20. The method of claim 1, wherein the KLHL11 polypeptide or fragment thereof is in a tissue section,
wherein step (a) comprises contacting the tissue section with the biological sample and a detectably-labeled secondary antibody under conditions in which a complex is formed between KLHL11 polypeptides in the tissue section, a corresponding KLHL11 autoantibody in the biological sample, if present, and the detectably-labeled secondary antibody, and
wherein step (b) comprises identifying a pattern of complex formation in the tissue sample by detecting the detectably-labeled secondary antibody, wherein the presence of a pattern of complex formation is indicative of the presence of a KLHL11 autoantibody in the biological sample, and wherein the absence of a pattern of complex formation is indicative of the absence of a KLHL11 autoantibody in the biological sample.

21. The method of claim 20, wherein the pattern of complex formation in the brain tissue is sparse yet widespread throughout the brain, including the hippocampus, cerebral cortex, cerebellum, midbrain, and brain stem, and is enriched in perivascular tissue, perimeningeal tissue, and white matter tracts.

22. The method of claim 1, wherein the KLHL11 polypeptide or fragment thereof is heterologously-expressed on the surface of a cell,
wherein step (a) comprises contacting the cell that heterologously-expresses the KLHL11 polypeptide or antigenic fragment thereof on its surface with the biological sample and a detectably-labeled secondary antibody under conditions in which a complex is formed between KLHL11 polypeptides in the tissue section, a corresponding KLHL11 autoantibody in the biological sample, if present, and the detectably-labeled secondary antibody, and
wherein step (b) comprises detecting the detectably-labeled secondary antibody, wherein detecting the presence of the detectably-labeled secondary antibody is indicative of the presence of a KLHL11 autoantibody in the biological sample, and wherein not detecting the presence of the detectably-labeled secondary antibody is indicative of the absence of a KLHL11 autoantibody in the biological sample.

23. The method of claim 1 comprising
(a) contacting the biological sample with a KLHL11 polypeptide having at least 95% identity to SEQ ID NO:1.

24. The method of claim 1 comprising
(a) contacting the biological sample with a KLHL11 polypeptide having at least 95% identity to one or more sequences of SEQ ID NOs: 1-30.

25. The method of claim 1 comprising
(a) contacting the biological sample with a KLHL11 polypeptide having at least 97% identity to one or more sequences of SEQ ID NOs: 1-30 or fragment thereof having at least 97% identity to one or more sequences of SEQ ID NOs: 1-30.

26. The method of claim 1, wherein the KLHL11 polypeptide or antigenic fragment thereof, is truncated at one or both termini by one or more amino acids.

* * * * *

SEQUENCE LISTING

```
<160> NUMBER OF SEQ ID NOS: 30

<210> SEQ ID NO 1
<211> LENGTH: 708
<212> TYPE: PRT
<213> ORGANISM: Homo sapiens

<400> SEQUENCE: 1

Met Ala Ala Ala Ala Val Ala Ala Ala Ala Ala Ala Ala Ala Ala Ala
1               5                   10                  15

Ser Leu Gln Val Leu Glu Met Glu Ser Met Glu Thr Ala Ala Ala Gly
                20                  25                  30

Ser Ala Gly Leu Ala Ala Glu Val Arg Gly Ser Gly Thr Val Asp Phe
            35                  40                  45

Gly Pro Gly Pro Gly Ile Ser Ala Met Glu Ala Ser Gly Gly Asp Pro
        50                  55                  60

Gly Pro Glu Ala Glu Asp Phe Glu Cys Ser Ser His Cys Ser Glu Leu
65                  70                  75                  80

Ser Trp Arg Gln Asn Glu Gln Arg Arg Gln Gly Leu Phe Cys Asp Ile
                85                  90                  95

Thr Leu Cys Phe Gly Gly Ala Gly Gly Arg Glu Phe Arg Ala His Arg
            100                 105                 110
```

-continued

Ser Val Leu Ala Ala Ala Thr Glu Tyr Phe Thr Pro Leu Leu Ser Gly
            115                 120                 125

Gln Phe Ser Glu Ser Arg Ser Gly Arg Val Glu Met Arg Lys Trp Ser
        130                 135                 140

Ser Glu Pro Gly Pro Glu Pro Asp Thr Val Glu Ala Val Ile Glu Tyr
145                 150                 155                 160

Met Tyr Thr Gly Arg Ile Arg Val Ser Thr Gly Ser Val His Glu Val
                165                 170                 175

Leu Glu Leu Ala Asp Arg Phe Leu Leu Ile Arg Leu Lys Glu Phe Cys
            180                 185                 190

Gly Glu Phe Leu Lys Lys Leu His Leu Ser Asn Cys Val Ala Ile
        195                 200                 205

His Ser Leu Ala His Met Tyr Thr Leu Ser Gln Leu Ala Leu Lys Ala
        210                 215                 220

Ala Asp Met Ile Arg Arg Asn Phe His Lys Val Ile Gln Asp Glu Glu
225                 230                 235                 240

Phe Tyr Thr Leu Pro Phe His Leu Ile Arg Asp Trp Leu Ser Asp Leu
                245                 250                 255

Glu Ile Thr Val Asp Ser Glu Glu Val Leu Phe Glu Thr Val Leu Lys
            260                 265                 270

Trp Val Gln Arg Asn Ala Glu Glu Arg Glu Arg Tyr Phe Glu Glu Leu
        275                 280                 285

Phe Lys Leu Leu Arg Leu Ser Gln Met Lys Pro Thr Tyr Leu Thr Arg
        290                 295                 300

His Val Lys Pro Glu Arg Leu Val Ala Asn Glu Val Cys Val Lys
305                 310                 315                 320

Leu Val Ala Asp Ala Val Glu Arg His Ala Leu Arg Ala Glu Asn Ile
                325                 330                 335

Gln Ser Gly Thr Cys Gln His Pro Thr Ser His Val Ser Leu Leu Pro
            340                 345                 350

Arg Tyr Gly Gln Asn Met Asp Val Ile Met Val Ile Gly Gly Val Ser
        355                 360                 365

Glu Gly Gly Asp Tyr Leu Ser Glu Cys Val Gly Tyr Phe Val Asp Glu
        370                 375                 380

Asp Arg Trp Val Asn Leu Pro His Ile His Asn His Leu Asp Gly His
385                 390                 395                 400

Ala Val Ala Val Thr Glu Ser Tyr Val Tyr Val Ala Gly Ser Met Glu
                405                 410                 415

Pro Gly Phe Ala Lys Thr Val Glu Arg Tyr Asn Pro Asn Leu Asn Thr
            420                 425                 430

Trp Glu His Val Cys Ser Leu Met Thr Arg Lys His Ser Phe Gly Leu
        435                 440                 445

Thr Glu Val Lys Gly Lys Leu Tyr Ser Ile Gly Gly His Gly Asn Phe
        450                 455                 460

Ser Pro Gly Phe Lys Asp Val Thr Val Tyr Asn Pro Glu Leu Asp Lys
465                 470                 475                 480

Trp His Asn Leu Glu Ser Ala Pro Lys Ile Leu Arg Asp Val Lys Ala
                485                 490                 495

Leu Ala Ile Glu Asp Arg Phe Val Tyr Ile Ala Ala Arg Thr Pro Val
            500                 505                 510

Asp Arg Asp Thr Glu Asp Gly Leu Lys Ala Val Ile Thr Cys Tyr Asp
        515                 520                 525

-continued

Thr Glu Thr Arg Gln Trp Gln Asp Val Glu Ser Leu Pro Leu Ile Asp
530                 535                 540

Asn Tyr Cys Phe Phe Gln Met Ser Val Val Asn Ser Asn Phe Tyr Gln
545                 550                 555                 560

Thr Ala Ser Cys Cys Pro Lys Ser Tyr Cys Leu Glu Asn Glu Glu Ala
                565                 570                 575

Val Arg Lys Ile Ala Ser Gln Val Ser Asp Glu Ile Leu Glu Ser Leu
            580                 585                 590

Pro Pro Glu Val Leu Ser Ile Glu Gly Ala Ala Ile Cys Tyr Tyr Lys
        595                 600                 605

Asp Asp Val Phe Ile Ile Gly Gly Trp Lys Asn Ser Asp Asp Ile Asp
610                 615                 620

Lys Gln Tyr Arg Lys Glu Ala Tyr Arg Tyr Cys Ala Glu Arg Lys Arg
625                 630                 635                 640

Trp Met Leu Leu Pro Met Pro Gln Pro Arg Cys Arg Ala Thr Ala
                645                 650                 655

Cys His Val Arg Ile Pro Tyr Arg Tyr Leu His Gly Thr Gln Arg Tyr
            660                 665                 670

Pro Met Pro Gln Asn Leu Met Trp Gln Lys Asp Arg Ile Arg Gln Met
        675                 680                 685

Gln Glu Ile His Arg His Ala Leu Asn Met Arg Val Pro Ser Ser
690                 695                 700

Gln Ile Glu Cys
705

<210> SEQ ID NO 2
<211> LENGTH: 49
<212> TYPE: PRT
<213> ORGANISM: Homo sapiens

<400> SEQUENCE: 2

Met Ala Ala Ala Val Ala Ala Ala Ala Ala Ala Ala Ala Ala Ala Ala
1               5                   10                  15

Ser Leu Gln Val Leu Glu Met Glu Ser Met Glu Thr Ala Ala Ala Gly
            20                  25                  30

Ser Ala Gly Leu Ala Ala Glu Val Arg Gly Ser Gly Thr Val Asp Phe
        35                  40                  45

Gly

<210> SEQ ID NO 3
<211> LENGTH: 49
<212> TYPE: PRT
<213> ORGANISM: Homo sapiens

<400> SEQUENCE: 3

Ser Met Glu Thr Ala Ala Ala Gly Ser Ala Gly Leu Ala Ala Glu Val
1               5                   10                  15

Arg Gly Ser Gly Thr Val Asp Phe Gly Pro Gly Pro Gly Ile Ser Ala
            20                  25                  30

Met Glu Ala Ser Gly Gly Asp Pro Gly Pro Glu Ala Glu Asp Phe Glu
        35                  40                  45

Cys

<210> SEQ ID NO 4
<211> LENGTH: 49
<212> TYPE: PRT
<213> ORGANISM: Homo sapiens

<400> SEQUENCE: 4

Gly Pro Gly Pro Gly Ile Ser Ala Met Glu Ala Ser Gly Gly Asp Pro
1               5                   10                  15

Gly Pro Glu Ala Glu Asp Phe Glu Cys Ser Ser His Cys Ser Glu Leu
            20                  25                  30

Ser Trp Arg Gln Asn Glu Gln Arg Gln Gly Leu Phe Cys Asp Ile
        35                  40                  45

Thr

<210> SEQ ID NO 5
<211> LENGTH: 49
<212> TYPE: PRT
<213> ORGANISM: Homo sapiens

<400> SEQUENCE: 5

Cys Ser Ser His Cys Ser Glu Leu Ser Trp Arg Gln Asn Glu Gln Arg
1               5                   10                  15

Arg Gln Gly Leu Phe Cys Asp Ile Thr Leu Cys Phe Gly Gly Ala Gly
            20                  25                  30

Gly Arg Glu Phe Arg Ala His Arg Ser Val Leu Ala Ala Ala Thr Glu
        35                  40                  45

Tyr

<210> SEQ ID NO 6
<211> LENGTH: 49
<212> TYPE: PRT
<213> ORGANISM: Homo sapiens

<400> SEQUENCE: 6

Thr Leu Cys Phe Gly Gly Ala Gly Gly Arg Glu Phe Arg Ala His Arg
1               5                   10                  15

Ser Val Leu Ala Ala Ala Thr Glu Tyr Phe Thr Pro Leu Leu Ser Gly
            20                  25                  30

Gln Phe Ser Glu Ser Arg Ser Gly Arg Val Glu Met Arg Lys Trp Ser
        35                  40                  45

Ser

<210> SEQ ID NO 7
<211> LENGTH: 49
<212> TYPE: PRT
<213> ORGANISM: Homo sapiens

<400> SEQUENCE: 7

Tyr Phe Thr Pro Leu Leu Ser Gly Gln Phe Ser Glu Ser Arg Ser Gly
1               5                   10                  15

Arg Val Glu Met Arg Lys Trp Ser Ser Glu Pro Gly Pro Glu Pro Asp
            20                  25                  30

Thr Val Glu Ala Val Ile Glu Tyr Met Tyr Thr Gly Arg Ile Arg Val
        35                  40                  45

Ser

<210> SEQ ID NO 8
<211> LENGTH: 49
<212> TYPE: PRT
<213> ORGANISM: Homo sapiens

<400> SEQUENCE: 8

Ser Glu Pro Gly Pro Glu Pro Asp Thr Val Glu Ala Val Ile Glu Tyr
1               5                   10                  15

Met Tyr Thr Gly Arg Ile Arg Val Ser Thr Gly Ser Val His Glu Val
            20                  25                  30

Leu Glu Leu Ala Asp Arg Phe Leu Leu Ile Arg Leu Lys Glu Phe Cys
        35                  40                  45

Gly

<210> SEQ ID NO 9
<211> LENGTH: 49
<212> TYPE: PRT
<213> ORGANISM: Homo sapiens

<400> SEQUENCE: 9

Ser Thr Gly Ser Val His Glu Val Leu Glu Leu Ala Asp Arg Phe Leu
1               5                   10                  15

Leu Ile Arg Leu Lys Glu Phe Cys Gly Glu Phe Leu Lys Lys Lys Leu
            20                  25                  30

His Leu Ser Asn Cys Val Ala Ile His Ser Leu Ala His Met Tyr Thr
        35                  40                  45

Leu

<210> SEQ ID NO 10
<211> LENGTH: 49
<212> TYPE: PRT
<213> ORGANISM: Homo sapiens

<400> SEQUENCE: 10

Gly Glu Phe Leu Lys Lys Lys Leu His Leu Ser Asn Cys Val Ala Ile
1               5                   10                  15

His Ser Leu Ala His Met Tyr Thr Leu Ser Gln Leu Ala Leu Lys Ala
            20                  25                  30

Ala Asp Met Ile Arg Arg Asn Phe His Lys Val Ile Gln Asp Glu Glu
        35                  40                  45

Phe

<210> SEQ ID NO 11
<211> LENGTH: 49
<212> TYPE: PRT
<213> ORGANISM: Homo sapiens

<400> SEQUENCE: 11

Leu Ser Gln Leu Ala Leu Lys Ala Ala Asp Met Ile Arg Arg Asn Phe
1               5                   10                  15

His Lys Val Ile Gln Asp Glu Glu Phe Tyr Thr Leu Pro Phe His Leu
            20                  25                  30

Ile Arg Asp Trp Leu Ser Asp Leu Glu Ile Thr Val Asp Ser Glu Glu
        35                  40                  45

Val

<210> SEQ ID NO 12
<211> LENGTH: 49
<212> TYPE: PRT
<213> ORGANISM: Homo sapiens

<400> SEQUENCE: 12

Phe Tyr Thr Leu Pro Phe His Leu Ile Arg Asp Trp Leu Ser Asp Leu
1               5                   10                  15

```
Glu Ile Thr Val Asp Ser Glu Glu Val Leu Phe Glu Thr Val Leu Lys
             20                  25                  30

Trp Val Gln Arg Asn Ala Glu Glu Arg Glu Arg Tyr Phe Glu Glu Leu
         35                  40                  45

Phe

<210> SEQ ID NO 13
<211> LENGTH: 49
<212> TYPE: PRT
<213> ORGANISM: Homo sapiens

<400> SEQUENCE: 13

Val Leu Phe Glu Thr Val Leu Lys Trp Val Gln Arg Asn Ala Glu Glu
1               5                   10                  15

Arg Glu Arg Tyr Phe Glu Glu Leu Phe Lys Leu Leu Arg Leu Ser Gln
             20                  25                  30

Met Lys Pro Thr Tyr Leu Thr Arg His Val Lys Pro Glu Arg Leu Val
         35                  40                  45

Ala

<210> SEQ ID NO 14
<211> LENGTH: 49
<212> TYPE: PRT
<213> ORGANISM: Homo sapiens

<400> SEQUENCE: 14

Phe Lys Leu Leu Arg Leu Ser Gln Met Lys Pro Thr Tyr Leu Thr Arg
1               5                   10                  15

His Val Lys Pro Glu Arg Leu Val Ala Asn Asn Glu Val Cys Val Lys
             20                  25                  30

Leu Val Ala Asp Ala Val Glu Arg His Ala Leu Arg Ala Glu Asn Ile
         35                  40                  45

Gln

<210> SEQ ID NO 15
<211> LENGTH: 49
<212> TYPE: PRT
<213> ORGANISM: Homo sapiens

<400> SEQUENCE: 15

Ala Asn Asn Glu Val Cys Val Lys Leu Val Ala Asp Ala Val Glu Arg
1               5                   10                  15

His Ala Leu Arg Ala Glu Asn Ile Gln Ser Gly Thr Cys Gln His Pro
             20                  25                  30

Thr Ser His Val Ser Leu Leu Pro Arg Tyr Gly Gln Asn Met Asp Val
         35                  40                  45

Ile

<210> SEQ ID NO 16
<211> LENGTH: 49
<212> TYPE: PRT
<213> ORGANISM: Homo sapiens

<400> SEQUENCE: 16

Gln Ser Gly Thr Cys Gln His Pro Thr Ser His Val Ser Leu Leu Pro
1               5                   10                  15

Arg Tyr Gly Gln Asn Met Asp Val Ile Met Val Ile Gly Gly Val Ser
             20                  25                  30
```

-continued

```
Glu Gly Gly Asp Tyr Leu Ser Glu Cys Val Gly Tyr Phe Val Asp Glu
            35                  40                  45
Asp

<210> SEQ ID NO 17
<211> LENGTH: 49
<212> TYPE: PRT
<213> ORGANISM: Homo sapiens

<400> SEQUENCE: 17

Ile Met Val Ile Gly Gly Val Ser Glu Gly Gly Asp Tyr Leu Ser Glu
1               5                   10                  15

Cys Val Gly Tyr Phe Val Asp Glu Asp Arg Trp Val Asn Leu Pro His
            20                  25                  30

Ile His Asn His Leu Asp Gly His Ala Val Ala Val Thr Glu Ser Tyr
        35                  40                  45
Val

<210> SEQ ID NO 18
<211> LENGTH: 49
<212> TYPE: PRT
<213> ORGANISM: Homo sapiens

<400> SEQUENCE: 18

Asp Arg Trp Val Asn Leu Pro His Ile His Asn His Leu Asp Gly His
1               5                   10                  15

Ala Val Ala Val Thr Glu Ser Tyr Val Tyr Val Ala Gly Ser Met Glu
            20                  25                  30

Pro Gly Phe Ala Lys Thr Val Glu Arg Tyr Asn Pro Asn Leu Asn Thr
        35                  40                  45
Trp

<210> SEQ ID NO 19
<211> LENGTH: 49
<212> TYPE: PRT
<213> ORGANISM: Homo sapiens

<400> SEQUENCE: 19

Val Tyr Val Ala Gly Ser Met Glu Pro Gly Phe Ala Lys Thr Val Glu
1               5                   10                  15

Arg Tyr Asn Pro Asn Leu Asn Thr Trp Glu His Val Cys Ser Leu Met
            20                  25                  30

Thr Arg Lys His Ser Phe Gly Leu Thr Glu Val Lys Gly Lys Leu Tyr
        35                  40                  45
Ser

<210> SEQ ID NO 20
<211> LENGTH: 49
<212> TYPE: PRT
<213> ORGANISM: Homo sapiens

<400> SEQUENCE: 20

Trp Glu His Val Cys Ser Leu Met Thr Arg Lys His Ser Phe Gly Leu
1               5                   10                  15

Thr Glu Val Lys Gly Lys Leu Tyr Ser Ile Gly Gly His Gly Asn Phe
            20                  25                  30

Ser Pro Gly Phe Lys Asp Val Thr Val Tyr Asn Pro Glu Leu Asp Lys
        35                  40                  45
```

Trp

<210> SEQ ID NO 21
<211> LENGTH: 49
<212> TYPE: PRT
<213> ORGANISM: Homo sapiens

<400> SEQUENCE: 21

Ser Ile Gly Gly His Gly Asn Phe Ser Pro Gly Phe Lys Asp Val Thr
1               5                   10                  15

Val Tyr Asn Pro Glu Leu Asp Lys Trp His Asn Leu Glu Ser Ala Pro
            20                  25                  30

Lys Ile Leu Arg Asp Val Lys Ala Leu Ala Ile Glu Asp Arg Phe Val
        35                  40                  45

Tyr

<210> SEQ ID NO 22
<211> LENGTH: 49
<212> TYPE: PRT
<213> ORGANISM: Homo sapiens

<400> SEQUENCE: 22

Trp His Asn Leu Glu Ser Ala Pro Lys Ile Leu Arg Asp Val Lys Ala
1               5                   10                  15

Leu Ala Ile Glu Asp Arg Phe Val Tyr Ile Ala Ala Arg Thr Pro Val
            20                  25                  30

Asp Arg Asp Thr Glu Asp Gly Leu Lys Ala Val Ile Thr Cys Tyr Asp
        35                  40                  45

Thr

<210> SEQ ID NO 23
<211> LENGTH: 49
<212> TYPE: PRT
<213> ORGANISM: Homo sapiens

<400> SEQUENCE: 23

Tyr Ile Ala Ala Arg Thr Pro Val Asp Arg Asp Thr Glu Asp Gly Leu
1               5                   10                  15

Lys Ala Val Ile Thr Cys Tyr Asp Thr Glu Thr Arg Gln Trp Gln Asp
            20                  25                  30

Val Glu Ser Leu Pro Leu Ile Asp Asn Tyr Cys Phe Gln Met Ser
        35                  40                  45

Val

<210> SEQ ID NO 24
<211> LENGTH: 49
<212> TYPE: PRT
<213> ORGANISM: Homo sapiens

<400> SEQUENCE: 24

Thr Glu Thr Arg Gln Trp Gln Asp Val Glu Ser Leu Pro Leu Ile Asp
1               5                   10                  15

Asn Tyr Cys Phe Phe Gln Met Ser Val Val Asn Ser Asn Phe Tyr Gln
            20                  25                  30

Thr Ala Ser Cys Cys Pro Lys Ser Tyr Cys Leu Glu Asn Glu Glu Ala
        35                  40                  45

Val

```
<210> SEQ ID NO 25
<211> LENGTH: 49
<212> TYPE: PRT
<213> ORGANISM: Homo sapiens

<400> SEQUENCE: 25

Val Val Asn Ser Asn Phe Tyr Gln Thr Ala Ser Cys Cys Pro Lys Ser
1               5                   10                  15

Tyr Cys Leu Glu Asn Glu Glu Ala Val Arg Lys Ile Ala Ser Gln Val
            20                  25                  30

Ser Asp Glu Ile Leu Glu Ser Leu Pro Pro Glu Val Leu Ser Ile Glu
        35                  40                  45

Gly

<210> SEQ ID NO 26
<211> LENGTH: 49
<212> TYPE: PRT
<213> ORGANISM: Homo sapiens

<400> SEQUENCE: 26

Val Arg Lys Ile Ala Ser Gln Val Ser Asp Glu Ile Leu Glu Ser Leu
1               5                   10                  15

Pro Pro Glu Val Leu Ser Ile Glu Gly Ala Ala Ile Cys Tyr Tyr Lys
            20                  25                  30

Asp Asp Val Phe Ile Ile Gly Gly Trp Lys Asn Ser Asp Asp Ile Asp
        35                  40                  45

Lys

<210> SEQ ID NO 27
<211> LENGTH: 49
<212> TYPE: PRT
<213> ORGANISM: Homo sapiens

<400> SEQUENCE: 27

Gly Ala Ala Ile Cys Tyr Tyr Lys Asp Asp Val Phe Ile Ile Gly Gly
1               5                   10                  15

Trp Lys Asn Ser Asp Asp Ile Asp Lys Gln Tyr Arg Lys Glu Ala Tyr
            20                  25                  30

Arg Tyr Cys Ala Glu Arg Lys Arg Trp Met Leu Leu Pro Pro Met Pro
        35                  40                  45

Gln

<210> SEQ ID NO 28
<211> LENGTH: 49
<212> TYPE: PRT
<213> ORGANISM: Homo sapiens

<400> SEQUENCE: 28

Lys Gln Tyr Arg Lys Glu Ala Tyr Arg Tyr Cys Ala Glu Arg Lys Arg
1               5                   10                  15

Trp Met Leu Leu Pro Pro Met Pro Gln Pro Arg Cys Arg Ala Thr Ala
            20                  25                  30

Cys His Val Arg Ile Pro Tyr Arg Tyr Leu His Gly Thr Gln Arg Tyr
        35                  40                  45

Pro

<210> SEQ ID NO 29
<211> LENGTH: 49
<212> TYPE: PRT
```

```
<213> ORGANISM: Homo sapiens

<400> SEQUENCE: 29

Gln Pro Arg Cys Arg Ala Thr Ala Cys His Val Arg Ile Pro Tyr Arg
1               5                   10                  15

Tyr Leu His Gly Thr Gln Arg Tyr Pro Met Pro Gln Asn Leu Met Trp
            20                  25                  30

Gln Lys Asp Arg Ile Arg Gln Met Gln Glu Ile His Arg His Ala Leu
        35                  40                  45

Asn

<210> SEQ ID NO 30
<211> LENGTH: 49
<212> TYPE: PRT
<213> ORGANISM: Homo sapiens

<400> SEQUENCE: 30

Arg Ile Pro Tyr Arg Tyr Leu His Gly Thr Gln Arg Tyr Pro Met Pro
1               5                   10                  15

Gln Asn Leu Met Trp Gln Lys Asp Arg Ile Arg Gln Met Gln Glu Ile
            20                  25                  30

His Arg His Ala Leu Asn Met Arg Arg Val Pro Ser Ser Gln Ile Glu
        35                  40                  45

Cys
```